(12) United States Patent
Kobayashi et al.

(10) Patent No.: US 8,155,172 B2
(45) Date of Patent: Apr. 10, 2012

(54) MATCHED FILTER

(75) Inventors: Kaoru Kobayashi, Chitose (JP); Shigeru Takegishi, Chitose (JP)

(73) Assignee: Nihon Dempa Kogyo Co., Ltd, Tokyo (JP)

( * ) Notice: Subject to any disclaimer, the term of this patent is extended or adjusted under 35 U.S.C. 154(b) by 924 days.

(21) Appl. No.: 12/213,983

(22) Filed: Jun. 26, 2008

(65) Prior Publication Data

US 2009/0010363 A1 Jan. 8, 2009

(30) Foreign Application Priority Data

Jun. 26, 2007 (JP) .............................. P.2007-167447

(51) Int. Cl.
*H04B 1/00* (2006.01)
(52) U.S. Cl. ...................................................... 375/152
(58) Field of Classification Search .................. 375/152, 375/147, 150, 148
See application file for complete search history.

(56) References Cited

U.S. PATENT DOCUMENTS

| | | | | |
|---|---|---|---|---|
| 5,450,395 A * | 9/1995 | Hostetter et al. | ............... | 370/320 |
| 5,583,884 A * | 12/1996 | Maruyama et al. | ............ | 375/143 |
| 6,268,742 B1 * | 7/2001 | Chapman | ........................ | 326/39 |
| 6,356,581 B1 * | 3/2002 | Nguyen et al. | ................. | 375/148 |
| 6,731,622 B1 * | 5/2004 | Frank et al. | ................... | 370/342 |
| 7,433,390 B2 * | 10/2008 | Hepler et al. | ................... | 375/150 |
| 7,463,671 B2 * | 12/2008 | Margulis et al. | ............... | 375/147 |
| 2002/0054625 A1 * | 5/2002 | Matsumoto et al. | .......... | 375/152 |
| 2003/0058972 A1 * | 3/2003 | Iochi | .............................. | 375/343 |
| 2004/0032839 A1 * | 2/2004 | Kaewell et al. | ............... | 370/320 |
| 2005/0286660 A1 * | 12/2005 | Nysen et al. | ................... | 375/343 |
| 2007/0058695 A1 * | 3/2007 | Cheng et al. | ................... | 375/148 |
| 2007/0248115 A1 * | 10/2007 | Miller et al. | ................... | 370/466 |
| 2008/0080468 A1 * | 4/2008 | Shen et al. | ..................... | 370/342 |
| 2009/0135782 A1 * | 5/2009 | Litwin | .......................... | 370/331 |

FOREIGN PATENT DOCUMENTS

| | | |
|---|---|---|
| JP | 09-080163 | 3/1997 |
| JP | 09-116522 | 5/1997 |
| JP | 11-196067 | 7/1999 |
| JP | 11-225093 | 8/1999 |
| JP | 2000-209124 | 7/2000 |
| JP | 2001-024560 | 1/2001 |
| JP | 2001-094471 | 4/2001 |
| JP | 2001-313591 | 11/2001 |
| JP | 2002-232322 | 8/2002 |
| JP | 2005-303928 | 10/2005 |

* cited by examiner

*Primary Examiner* — Jaison Joseph
(74) *Attorney, Agent, or Firm* — Jacobson Holman PLLC

(57) ABSTRACT

Provided is a matched filter whose circuit scale can be made significantly smaller by reducing the number of multipliers for a despreading process and the number of adders for an accumulating process. For each in-phase/orthogonal component, the matched filter includes a dual-port RAM that separates written samples into 128 groups each of 32 samples which are collectively read out group by group in order at a speed faster than a write speed in write mode, a bit separating section that separates data read group by group into 32 samples and simultaneously outputs the 32 samples, and 32 despreading/accumulating circuits that, with 16 samples sequentially input from 16 groups being taken as one block, sequentially despread individual samples, accumulate despreading results, and output accumulated values for each block. The matched filter further includes an accumulating section that accumulates absolute values for each block from in-phase/orthogonal outputs of the despreading/accumulating circuits, and outputs correlation value data.

17 Claims, 14 Drawing Sheets

| | PATTERN 0 | PATTERN 1 | PATTERN 2 | PATTERN 3 | PATTERN 4 | PATTERN 5 | PATTERN 6 | ... | PATTERN 10 | PATTERN 11 | PATTERN 12 | PATTERN 13 | PATTERN 14 | PATTERN 15 |
|---|---|---|---|---|---|---|---|---|---|---|---|---|---|---|
| Code(0) | 0 | 1 | 2 | 3 | 4 | 5 | 6 | | 10 | 11 | 12 | 13 | 14 | 15 |
| Code(1) | 16 | 17 | 18 | 19 | 20 | 21 | 22 | | 26 | 27 | 28 | 29 | 30 | 31 |
| Code(2) | 32 | 33 | 34 | 35 | 36 | 37 | 38 | | 42 | 43 | 44 | 45 | 46 | 47 |
| Code(3) | 48 | 49 | 50 | 51 | 52 | 53 | 54 | | 58 | 59 | 60 | 61 | 62 | 63 |
| Code(4) | 64 | 65 | 66 | 67 | 68 | 69 | 70 | | 74 | 75 | 76 | 77 | 78 | 79 |
| Code(5) | 80 | 81 | 82 | 83 | 84 | 85 | 86 | | 90 | 91 | 92 | 93 | 94 | 95 |
| Code(6) | 96 | 97 | 98 | 99 | 100 | 101 | 102 | | 106 | 107 | 108 | 109 | 110 | 111 |
| Code(7) | 112 | 113 | 114 | 115 | 116 | 117 | 118 | | 122 | 123 | 124 | 125 | 126 | 127 |
| ⋮ | | | | | | | | | | | | | | |
| Code(24) | 384 | 385 | 386 | 387 | 388 | 389 | 390 | | 394 | 395 | 396 | 397 | 398 | 399 |
| Code(25) | 400 | 401 | 402 | 403 | 404 | 405 | 406 | | 410 | 411 | 412 | 413 | 414 | 415 |
| Code(26) | 416 | 417 | 418 | 419 | 420 | 421 | 422 | | 426 | 427 | 428 | 429 | 430 | 431 |
| Code(27) | 432 | 433 | 434 | 435 | 436 | 437 | 438 | | 442 | 443 | 444 | 445 | 446 | 447 |
| Code(28) | 448 | 449 | 450 | 451 | 452 | 453 | 454 | | 458 | 459 | 460 | 461 | 462 | 463 |
| Code(29) | 464 | 465 | 466 | 467 | 468 | 469 | 470 | | 474 | 475 | 476 | 477 | 478 | 479 |
| Code(30) | 480 | 481 | 482 | 483 | 484 | 485 | 486 | | 490 | 491 | 492 | 493 | 494 | 495 |
| Code(31) | 496 | 497 | 498 | 499 | 500 | 501 | 502 | | 506 | 507 | 508 | 509 | 510 | 511 |

FIG.11

| | \multicolumn{16}{c}{ADDRESS OUTPUT SIGNAL IN CLOCK OF 4MHz} | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| PATTERN 0 | 0 | 8 | 16 | 24 | 32 | 40 | 48 | 56 | 64 | 72 | 80 | 88 | 96 | 104 | 112 | 120 |
| PATTERN 1 | 1 | 9 | 17 | 25 | 33 | 41 | 49 | 57 | 65 | 73 | 81 | 89 | 97 | 105 | 113 | 121 |
| PATTERN 2 | 2 | 10 | 18 | 26 | 34 | 42 | 50 | 58 | 66 | 74 | 82 | 90 | 98 | 106 | 114 | 122 |
| PATTERN 3 | 3 | 11 | 19 | 27 | 35 | 43 | 51 | 59 | 67 | 75 | 83 | 91 | 99 | 107 | 115 | 123 |
| PATTERN 4 | 4 | 12 | 20 | 28 | 36 | 44 | 52 | 60 | 68 | 76 | 84 | 92 | 100 | 108 | 116 | 124 |
| PATTERN 5 | 5 | 13 | 21 | 29 | 37 | 45 | 53 | 61 | 69 | 77 | 85 | 93 | 101 | 109 | 117 | 125 |
| PATTERN 6 | 6 | 14 | 22 | 30 | 38 | 46 | 54 | 62 | 70 | 78 | 86 | 94 | 102 | 110 | 118 | 126 |
| PATTERN 7 | 7 | 15 | 23 | 31 | 39 | 47 | 55 | 63 | 71 | 79 | 87 | 95 | 103 | 111 | 119 | 127 |
| PATTERN 8 | 8 | 16 | 24 | 32 | 40 | 48 | 56 | 64 | 72 | 80 | 88 | 96 | 104 | 112 | 120 | 0 |
| PATTERN 9 | 9 | 17 | 25 | 33 | 41 | 49 | 57 | 65 | 73 | 81 | 89 | 97 | 105 | 113 | 121 | 1 |
| PATTERN 10 | 10 | 18 | 26 | 34 | 42 | 50 | 58 | 66 | 74 | 82 | 90 | 98 | 106 | 114 | 122 | 2 |
| PATTERN 11 | 11 | 19 | 27 | 35 | 43 | 51 | 59 | 67 | 75 | 83 | 91 | 99 | 107 | 115 | 123 | 3 |
| PATTERN 12 | 12 | 20 | 28 | 36 | 44 | 52 | 60 | 68 | 76 | 84 | 92 | 100 | 108 | 116 | 124 | 4 |
| PATTERN 13 | 13 | 21 | 29 | 37 | 45 | 53 | 61 | 69 | 77 | 85 | 93 | 101 | 109 | 117 | 125 | 5 |
| PATTERN 14 | 14 | 22 | 30 | 38 | 46 | 54 | 62 | 70 | 78 | 86 | 94 | 102 | 110 | 118 | 126 | 6 |
| PATTERN 15 | 15 | 23 | 31 | 39 | 47 | 55 | 63 | 71 | 79 | 87 | 95 | 103 | 111 | 119 | 127 | 7 |
| PATTERN 16 | 16 | 24 | 32 | 40 | 48 | 56 | 64 | 72 | 80 | 88 | 96 | 104 | 112 | 120 | 0 | 8 |
| PATTERN 17 | 17 | 25 | 33 | 41 | 49 | 57 | 65 | 73 | 81 | 89 | 97 | 105 | 113 | 121 | 1 | 9 |
| PATTERN 18 | 18 | 26 | 34 | 42 | 50 | 58 | 66 | 74 | 82 | 90 | 98 | 106 | 114 | 122 | 2 | 10 |
| PATTERN 19 | 19 | 27 | 35 | 43 | 51 | 59 | 67 | 75 | 83 | 91 | 99 | 107 | 115 | 123 | 3 | 11 |
| PATTERN 20 | 20 | 28 | 36 | 44 | 52 | 60 | 68 | 76 | 84 | 92 | 100 | 108 | 116 | 124 | 4 | 12 |
| PATTERN 21 | 21 | 29 | 37 | 45 | 53 | 61 | 69 | 77 | 85 | 93 | 101 | 109 | 117 | 125 | 5 | 13 |
| PATTERN 22 | 22 | 30 | 38 | 46 | 54 | 62 | 70 | 78 | 86 | 94 | 102 | 110 | 118 | 126 | 6 | 14 |
| PATTERN 23 | 23 | 31 | 39 | 47 | 55 | 63 | 71 | 79 | 87 | 95 | 103 | 111 | 119 | 127 | 7 | 15 |
| PATTERN 24 | 24 | 32 | 40 | 48 | 56 | 64 | 72 | 80 | 88 | 96 | 104 | 112 | 120 | 0 | 8 | 16 |
| ~ | | | | | | | | | | | | | | | | ~ |
| PATTERN 108 | 108 | 116 | 124 | 4 | 12 | 20 | 28 | 36 | 44 | 52 | 60 | 68 | 76 | 84 | 92 | 100 |
| PATTERN 109 | 109 | 117 | 125 | 5 | 13 | 21 | 29 | 37 | 45 | 53 | 61 | 69 | 77 | 85 | 93 | 101 |
| PATTERN 110 | 110 | 118 | 126 | 6 | 14 | 22 | 30 | 38 | 46 | 54 | 62 | 70 | 78 | 86 | 94 | 102 |
| PATTERN 111 | 111 | 119 | 127 | 7 | 15 | 23 | 31 | 39 | 47 | 55 | 63 | 71 | 79 | 87 | 95 | 103 |
| PATTERN 112 | 112 | 120 | 0 | 8 | 16 | 24 | 32 | 40 | 48 | 56 | 64 | 72 | 80 | 88 | 96 | 104 |
| PATTERN 113 | 113 | 121 | 1 | 9 | 17 | 25 | 33 | 41 | 49 | 57 | 65 | 73 | 81 | 89 | 97 | 105 |
| PATTERN 114 | 114 | 122 | 2 | 10 | 18 | 26 | 34 | 42 | 50 | 58 | 66 | 74 | 82 | 90 | 98 | 106 |
| PATTERN 115 | 115 | 123 | 3 | 11 | 19 | 27 | 35 | 43 | 51 | 59 | 67 | 75 | 83 | 91 | 99 | 107 |
| PATTERN 116 | 116 | 124 | 4 | 12 | 20 | 28 | 36 | 44 | 52 | 60 | 68 | 76 | 84 | 92 | 100 | 108 |
| PATTERN 117 | 117 | 125 | 5 | 13 | 21 | 29 | 37 | 45 | 53 | 61 | 69 | 77 | 85 | 93 | 101 | 109 |
| PATTERN 118 | 118 | 126 | 6 | 14 | 22 | 30 | 38 | 46 | 54 | 62 | 70 | 78 | 86 | 94 | 102 | 110 |
| PATTERN 119 | 119 | 127 | 7 | 15 | 23 | 31 | 39 | 47 | 55 | 63 | 71 | 79 | 87 | 95 | 103 | 111 |
| PATTERN 120 | 120 | 0 | 8 | 16 | 24 | 32 | 40 | 48 | 56 | 64 | 72 | 80 | 88 | 96 | 104 | 112 |
| PATTERN 121 | 121 | 1 | 9 | 17 | 25 | 33 | 41 | 49 | 57 | 65 | 73 | 81 | 89 | 97 | 105 | 113 |
| PATTERN 122 | 122 | 2 | 10 | 18 | 26 | 34 | 42 | 50 | 58 | 66 | 74 | 82 | 90 | 98 | 106 | 114 |
| PATTERN 123 | 123 | 3 | 11 | 19 | 27 | 35 | 43 | 51 | 59 | 67 | 75 | 83 | 91 | 99 | 107 | 115 |
| PATTERN 124 | 124 | 4 | 12 | 20 | 28 | 36 | 44 | 52 | 60 | 68 | 76 | 84 | 92 | 100 | 108 | 116 |
| PATTERN 125 | 125 | 5 | 13 | 21 | \multicolumn{10}{c}{RETURN TO PATTERN0 AFTER PATTERN127} | 109 | 117 |
| PATTERN 126 | 126 | 6 | 14 | 22 | | | | | | | | | | | 110 | 118 |
| PATTERN 127 | 127 | 7 | 15 | 23 | 31 | 39 | 47 | 55 | 63 | 71 | 79 | 87 | 95 | 103 | 111 | 119 |
| PATTERN 0 | 0 | 8 | 16 | 24 | 32 | 40 | 48 | 56 | 64 | 72 | 80 | 88 | 96 | 104 | 112 | 120 |
| PATTERN 1 | 1 | 9 | 17 | 25 | 33 | 41 | 49 | 57 | 65 | 73 | 81 | 89 | 97 | 105 | 113 | 121 |

MATCHED FILTER

BACKGROUND OF THE INVENTION

1. Field of the Invention

The present invention relates to a matched filter to be used in synchronous acquisition or the like in wireless communication, and, more particularly, to a matched filter whose circuit scale can be reduced considerably.

2. Description of the Related Art

[Conventional Matched Filter (1): FIG. 13]

A conventional matched filter will be described referring to FIG. 13. FIG. 13 is a configurational diagram showing one example of a conventional matched filter.

As shown in FIG. 13, in a case of 8× oversampling for 512 chips, for example, a conventional matched filter includes, for each of an I component (in-phase component) and a Q component (orthogonal component) of a received signal orthogonally detected and 8×-oversampled, a matched filter circuit section having 512×8 FFs (Flip Flops) 31, multipliers 32 equal in number to the FFs 31, and an accumulating section 33, and a $\sqrt{(I^2+Q^2)}$ calculating section 34. Although the configuration of the matched filter circuit for the Q component is not shown, it is the same as that for the I component.

Each FF 31 holds an input sample for one sample time, and then outputs the sample.

Each multiplier 32 performs despreading by multiplying a sample output from an associated FF 31 by a set spread code. The spread code corresponds to an associated chip.

The accumulating section 33 adds up all the outputs of the multipliers 32.

The $\sqrt{(I^2+Q^2)}$ calculating section 34 calculates correlation value data by performing an operation $\sqrt{(I^2+Q^2)}$ based on values output from the accumulating section 33 for the I component and the accumulating section for the Q component.

In the matched filter with the foregoing configuration, for each of the I component and Q component, the FFs 31 hold samples at every sample timing, the multipliers 32 perform despreading by multiplying the held samples by spread codes for the respective chips, the accumulating section 33 adds up all the outputs of the multipliers 32, and the $\sqrt{(I^2+Q^2)}$ calculating section 34 calculates and outputs correlation value data at every sample time. Then, synchronous acquisition is carried out based on the correlation value data output from the matched filter.

However, the conventional matched filter with the foregoing configuration takes a structure of spread symbol length× oversampled taps, thus undesirably increasing the circuit scale.

[Conventional Matched Filter (2): FIG. 14]

There is a matched filter intended to reduce the circuit scale (second conventional matched filter). The second conventional matched filter will be described referring to FIG. 14. FIG. 14 is a configurational diagram the configuration of the second conventional matched filter.

As shown in FIG. 14, for each of an I component and a Q component, the second conventional matched filter includes a moving average filter (N=8) 35, FFs 31 separated into 512 blocks each containing eight FFs 31, multipliers 32 each provided for eight FFs 31, an accumulating section 33 and a $\sqrt{(I^2+Q^2)}$ calculating section 34.

The moving average filter (N=8) 35 outputs a moving average which is an average of data of eight samples.

Each multiplier 32 performs despreading by multiplying a moving average, output for every eight FFs 31, by a spread code corresponding to an associated chip.

The FF 31, the accumulating section 33 and the $\sqrt{(I^2+Q^2)}$ calculating section 34 will not be described for their structures are the same as those of the first conventional matched filter (1).

In the second conventional matched filter, for each of an I component and a Q component, the moving average filter (N=8) 35 outputs a moving average for every eight samples, each FF 31 holds the moving average at every sample timing, each multiplier 32 performs despreading by multiplying the moving average by the spread code for each block (for every eight moving averages), the accumulating section 33 adds up all the multiplication results, and the $\sqrt{(I^2+Q^2)}$ calculating section 34 calculates and outputs correlation value data at every sample time.

Because the second conventional matched filter performs despreading every eight moving averages each for eight samples, the number of the multipliers can be ⅛ of the number of the FFs 31 and can thus be reduced to ⅛ of the number of the FFs 31 of the first conventional matched filter as shown in FIG. 13.

[Documents on Related Arts]

Related arts on a matched filter are disclosed in Japanese Patent Application Laid-Open No. H09-080163 (Patent Document 1), Japanese Patent Application Laid-Open No. H09-116522 (Patent Document 2), Japanese Patent Application Laid-Open No. H11-196067 (Patent Document 3), and Japanese Patent Application Laid-Open No. H11-225093 (Patent Document 4).

Patent Document 1 describes the configuration of a system which uses a matched filter and performs a sampling process using a dual-port RAM.

However, Patent Document 1 does not reduce the circuit scale in the despreading process employing specific ways of writing and reading data to and from the dual-port RAM.

Patent Document 2 describes the configuration of a matched filter which performs a sample/hold process selectively using two RAMs.

Patent Document 3 describes the configuration of a matched filter which detects a delay path using a plurality of registers in a sample/hold process.

Patent Document 4 describes the configuration of a matched filter which receives signals using a plurality of registers in a sample/hold process.

However, none of the configurations in Patent Documents 2 to 4 use a dual-port RAM.

[Patent Document 1] Japanese Patent Application Laid-Open No. H09-080163

[Patent Document 2] Japanese Patent Application Laid-Open No. H09-116522

[Patent Document 3] Japanese Patent Application Laid-Open No. H11-196067

[Patent Document 4] Japanese Patent Application Laid-Open No. H11-225093

To improve the timing precision for synchronous acquisition, however, the conventional matched filters suffer an increase in the circuit scale due to an increased number of taps. In addition, the second conventional matched filter which performs a separation process cannot use a dual-port RAM.

SUMMARY OF THE INVENTION

Accordingly, it is an object of the invention to provide a matched filter whose circuit scale can be made significantly smaller by reducing the number of multipliers in a despreading process.

To overcome the conventional problems, according to one aspect of the invention, there is provided a matched filter for outputting correlation value data based on input samples, which includes a dual-port memory, provided for each of an in-phase component and an orthogonal component of an input signal, that separates written samples into a specific number of groups of samples which are collectively read out group by group in order at a speed faster than a write speed in write mode, a bit separating section, provided for each of the in-phase component and the orthogonal component, that separates data collectively read group by group into samples and simultaneously outputs the samples, a plurality of despreading/accumulating circuits, provided for each of the in-phase component and the orthogonal component, that serially receive samples separated from a plurality of groups as blocks, despread respective samples, accumulate despreading results, and output accumulated values for each block, a plurality of absolute value calculating circuits that calculate absolute values for each block from outputs of the plurality of despreading/accumulating circuits for the in-phase component and outputs of the plurality of despreading/accumulating circuits for the orthogonal component, and an accumulating section that accumulates outputs of the plurality of absolute value calculating circuits and outputs correlation value data. Because a plurality of samples are despread in order block by block and despreading results are accumulated, the multipliers for the despreading process and the adders for the accumulating process can be equal in number to the blocks, so that the circuit scale can be reduced accordingly.

According to another aspect of the invention, there is provided a matched filter for outputting correlation value data based on samples originated from 5 chip 8× oversampling, which includes a dual-port RAM, provided for each of an in-phase component and an orthogonal component of an input signal, that separates written samples into 128 groups each of 32 samples which are collectively read out group by group in order at a speed faster than a write speed in write mode, a bit separating section, provided for each of the in-phase component and the orthogonal component, that separates data collectively read group by group into samples and simultaneously outputs 32 samples, 32 despreading/accumulating circuits, provided for each of the in-phase component and the orthogonal component, that, with 16 samples sequentially input from 16 groups in the 128 groups being taken as one block, sequentially despread individual samples with corresponding spread codes, accumulate despreading results, and output accumulated values for each block, 32 absolute value calculating circuits that calculate absolute values for each block from outputs of the 32 despreading/accumulating circuits for the in-phase component and outputs of the 32 despreading/accumulating circuits for the orthogonal component, and an accumulating section that accumulates outputs of the 32 absolute value calculating circuits and outputs correlation value data. Because a plurality of samples are despread in order block by block and despreading results are accumulated, the multipliers for the despreading process and the adders for the accumulating process can be equal in number to the blocks, i.e., the numbers of the multipliers and adders can be reduced to 1/16, so that the circuit scale can be reduced accordingly.

In the matched filter according to the second aspect, the group is formed to have 32 samples extracted every 128-th sampling number.

In the matched filter according to the second aspect, writing into the dual-port RAM is performed in a clock of 256 kHz, and reading therefrom is performed in a clock of 4 MHz.

This can make reading faster than writing, so that the processing can be executed quickly.

In the matched filter according to the second aspect, reading from the dual-port RAM starts after all of 4096 samples for 512 1-bit chips are written into the dual-port RAM.

The matched filter according to the second aspect further includes an address generating circuit that sends a read address specifying a group to be read to the dual-port RAM and stores eight read address patterns each having 16 addresses extracted every 9-th addresses from among addresses 0 to 127, wherein the eight read address patterns are sequentially selected, changed over from one read address pattern to another, in a clock of 256 kHz, and 16 addresses included in the selected read address pattern are sequentially output from a top in a clock of 4 MHz. As all of 4096 samples written in the dual-port RAM in eight clocks of 256 kHz, the processing can be executed quickly.

In the matched filter according to the second aspect, reading from the dual-port RAM starts after a 4089-th sample is written into the dual-port RAM since writing has started. Since reading of 16 groups is completed at 4 MHz until a next sample is written in the dual-port RAM at 256 kHz, it is possible to complete reading of 16×7 groups until the 4096-th sample is written and complete reading of the last 16 groups after the 4096-th sample is written. This can allow reading to be executed in parallel to writing without interrupting the writing process, thus making the processing faster, and can achieve a stable reception process without an interruption-originated failure of detection of correlation values of original received data.

The matched filter according to the second aspect further includes an address generating circuit that sends a read address specifying a group to be read to the dual-port RAM and stores a total of 128 read address patterns each having 16 read address patterns generated by sequentially shifting an arrangement of 16 addresses forming each read address pattern for each read address pattern based on eight read address patterns each having 16 addresses extracted every 9-th addresses from among addresses 0 to 127, wherein the eight read address patterns are sequentially selected, changed over from one read address pattern to another, in a clock of 256 kHz, and 16 addresses included in the selected read address pattern are sequentially output from a top in an order of the arrangement in a clock of 4 MHz. This configuration can allow reading to be executed in parallel to writing without interrupting the writing process, thus making the processing faster, and can achieve a stable reception process without an interruption-originated failure of detection of correlation values of original received data.

The matched filter according to the second aspect further includes a despread symbol outputting section that outputs spread codes to each of the despreading/accumulating circuits, stores a separation symbol pattern defining an arrangement order of 16 kinds of spread codes for each despreading/accumulating circuit, and sequentially selects the 16 kinds of spread codes of the separation symbol pattern in the arrangement order and outputs the selected spread code to a corresponding one of the despreading/accumulating circuits in a clock of 4 MHz. It is therefore possible to despread each sample with an adequate spread code for an associated chip.

BRIEF DESCRIPTION OF THE DRAWINGS

FIG. 6 is an exemplary and explanatory diagram showing read addresses from an output port B.

FIG. 8 is an explanatory diagram showing patterns of despread codes output from a despread symbol separating/outputting section.

FIG. 11 is an exemplary and explanatory diagram showing read address patterns of the another matched filter.

DESCRIPTION OF REFERENCE NUMERALS

Figure 1:
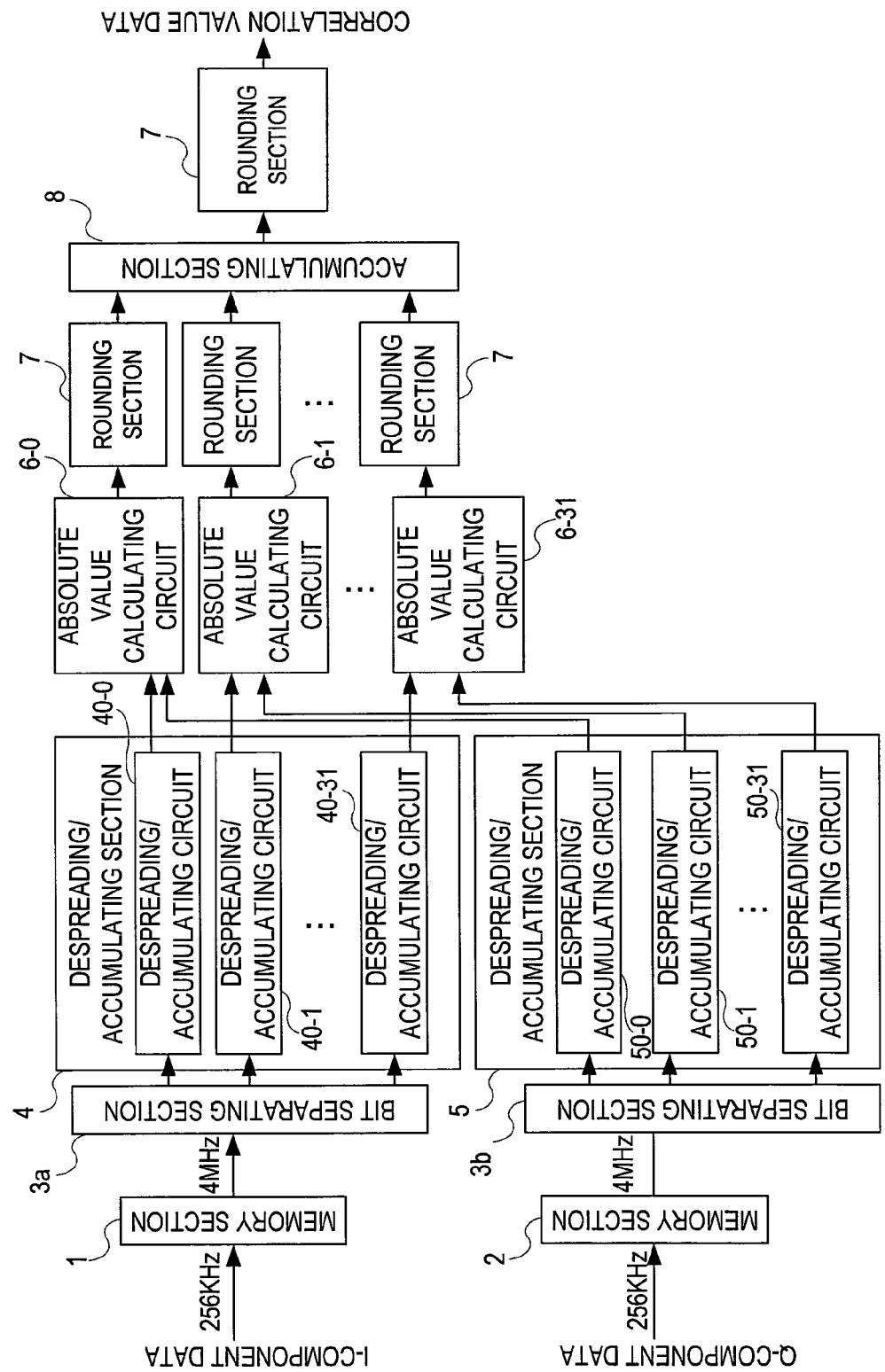
FIG. 1 is a schematic configurational block diagram showing the schematic configuration of a matched filter according to an embodiment of the present invention (present matched filter).

1, 2: memory section
3a, 3b: bit separating section
4, 5: despreading/accumulating section
6: absolute value calculating circuit
7: rounding section
8: accumulating section
11, 21: moving average filter
12, 22: dual-port RAM
13, 23: lower-248-bits extracting section
14, 24: bit combining section
40, 50: despreading/accumulating circuit

DETAILED DESCRIPTION OF THE PREFERRED EMBODIMENTS

[Outline of the Invention]

A preferred embodiment of the present invention will be described below with reference to the accompanying drawings.

A matched filter according to the present invention uses a dual-port RAM in a sample/hold process, separates written sample data into 128 groups, collectively reads sample data group by group with a processing clock faster than the write speed, separates 32 pieces of sample data extracted from each group into 32 blocks, and performs a despreading/accumulating process on every 16 samples block by block through distributed parallel processing. Therefore, the numbers of multipliers and adders required can be equal to the number of blocks, so that the numbers of the multipliers and adders can be reduced to $\frac{1}{16}$ (=32/512), thus it possible to reduce the circuit scale significantly.

[Configuration of Present Matched Filter: FIG. 1]

The schematic configuration of the matched filter according to the embodiment of the invention will be described referring to FIG. 1. FIG. 1 is a schematic configurational block diagram showing the schematic configuration of the matched filter according to the embodiment of the invention (present matched filter). The description will be given of a case of 8× oversampling for 512 chips.

As shown in FIG. 1, the present matched filter includes memory sections 1, 2, bit separating sections 3a, 3b, despreading/accumulating sections 4, 5, absolute value calculating circuits 6-0 to 6-31, a rounding section 7 and an accumulating section 8.

The individual components will be described below.

The memory section 1 includes a dual-port RAM and can hold sample data of an I component in an oversampled received signal for 512 chips (1 bit). Likewise, the memory section 2 is a dual-port RAM which holds one bit of sample data of a Q component in the oversampled received signal. Specific structures of the memory sections 1, 2 will be described later.

The present matched filter is characterized by methods of writing and reading data to and from the memory sections 1, 2. Sample data for 512 chips (1 bit) is separated into 128 groups each containing 32 samples, and is read group by group in a fast clock. The methods of writing and reading data to and from the memory sections 1, 2 will be described in detail later.

The bit separating section 3a separates a group of sample data for the I component output from the memory section 1 into 8-bit data to sequentially extract 32 samples, and outputs the 32 samples to despreading/accumulating circuits 40-0 to 40-31 of the despreading/accumulating section 4 one sample at a time.

Likewise, the bit separating section 3b extracts 8-bit sample data from a group of sample data for the Q component output from the memory section 2, and outputs the sample data to despreading/accumulating circuits 50-0 to 50-31 one sample at a time.

The despreading/accumulating section 4 includes 32 despreading/accumulating circuits 40-0 to 40-31, despreads sample data input from the bit separating section 3a, accumulates despreading results, and outputs 12-bit accumulated values for the respective blocks to the respective absolute value calculating circuits 6-0 to 6-31. Each despreading/accumulating circuit 40 performs a despreading/accumulating process block by block.

Likewise, the despreading/accumulating section 5 includes 32 despreading/accumulating circuits 50-0 to 50-31, despreads sample data input from the bit separating section 3b, accumulates despreading results, and outputs accumulated values for the respective blocks to the respective absolute value calculating circuits 6-0 to 6-31.

Each of the absolute value calculating circuits 6-0 to 6-31 calculates an absolute value for each block based on the block-by-block accumulated value of despread data for the I component and Q component input from the respective despreading/accumulating circuit 40 and despreading/accumulating circuit 50, and outputs the absolute value of 12 bits to the accumulating section 8.

The rounding section 7 reduces the number of digits in data, rounds 12-bit data output from the absolute value calculating circuit 6 to 8-bit data, or rounds 13-bit data from the accumulating section 8 absolute value to 8-bit data, and outputs the rounded data as correlation value data.

The accumulating section 8 adds up all the absolute values for each block input from the absolute value calculating circuits 6-0 to 6-31, and outputs correlation value data.

The structure of the present matched filter at and following the bit combining sections 3 is called "correlation calculating section".

The correlation calculating section of the present matched filter is provided with a despread symbol separating section (not shown) which performs a process of outputting spread symbols (spread codes) to the despreading/accumulating circuits 40, 50. The despread symbol separating section separates a 512-chip spread symbol chip by chip, and outputs the separated spread symbols to the despreading/accumulating circuits 40-0 to 40-31 and despreading/accumulating circuits 50 at 4 MHz in accordance with a predetermined pattern according to blocks of samples output from the bit separating sections 3*a*, 3*b*. The pattern of spread codes output from the despread symbol separating section will be described later.

[Operation of Present Matched Filter]

The operation of the present matched filter with the foregoing configuration will be briefly described.

Oversampled I-component (or Q-component) data is stored in the memory section 1 (memory section 2) in a clock of 256 kHz, is read out for each group in a clock of 4 MHz to be separated into sample data by the bit separating section 3*a* (bit separating section 3*b*), and is sequentially input to the associated despreading/accumulating circuits 40-0 to 40-31 (despreading/accumulating circuits 50-0 to 50-31) for each block.

Each of the despreading/accumulating circuits 40-0 to 40-31 (despreading/accumulating circuits 50-0 to 50-31) despreads sample data by multiplying the sample data by a predetermined spread symbol, and accumulates despreading results to output an accumulated value for each block. Each absolute value calculating circuit 6 calculates the absolute value of the accumulated value which is rounded by the rounding section 7. The accumulating section 8 accumulates the absolute values output from the individual absolute value calculating circuits 6 to be correlation value data to be output. The operation of the present matched filter is carried out in the foregoing manner.

Figure 2:
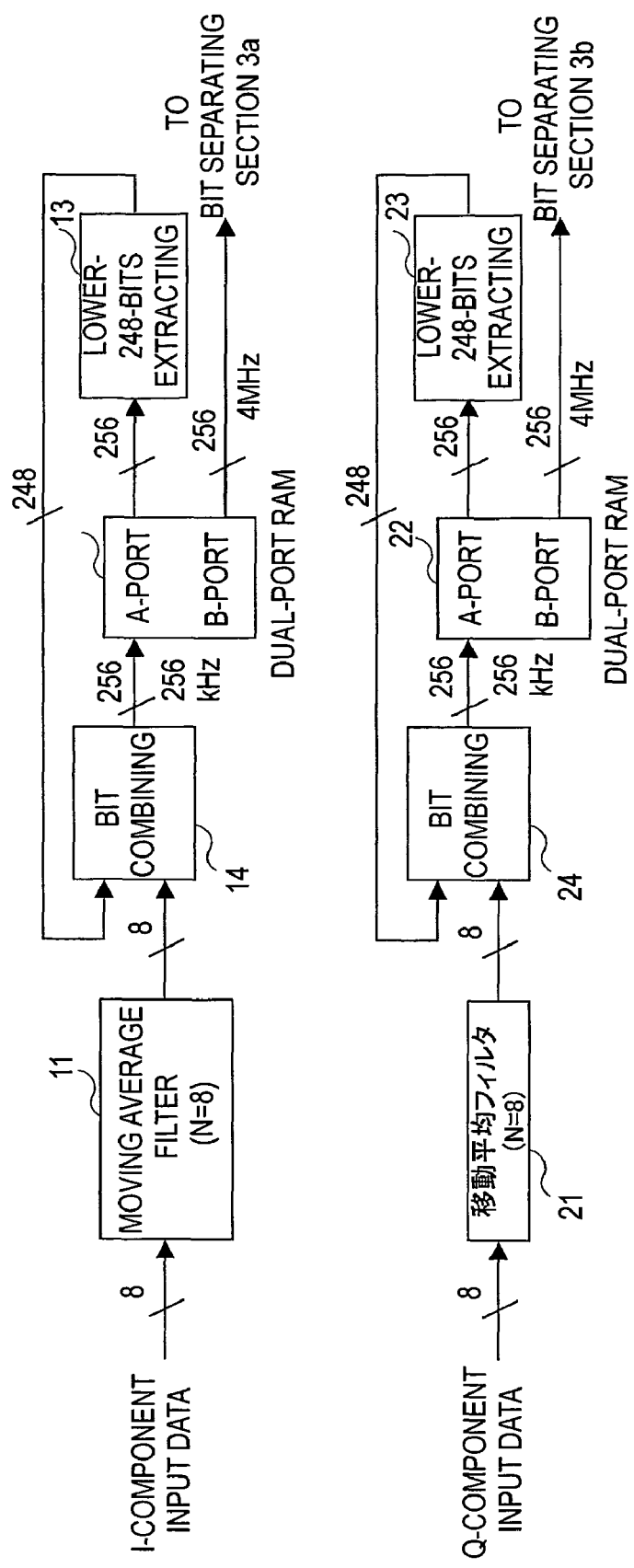
FIG. 2 is a block diagram showing the configurations of memory units 1 and 2.

[Configuration of Memory Section 1, 2: FIG. 2]

Next, the configuration of the memory section 1, 2 will be described referring to FIG. 2. FIG. 2 is a block diagram showing the configurations of memory units 1 and 2.

As shown in FIG. 2, the memory section 1 has a moving average filter (N=8) 11, a dual-port RAM 12, a lower-248-bits extracting section 13, and a bit combining section 14, and the memory section 2 has a moving average filter (N=8) 21, a dual-port RAM 22, a lower-248-bits extracting section 23, and a bit combining section 24.

The moving average filter (N=8) 11 receives 8-bit I-component input data undergone 8× oversampling, and outputs an 8-bit moving average (hereinafter called "sample"), which is an average of eight pieces of sample data, at 256 kHz.

The moving average filter (N=8) 21 performs a process for the Q component, which is similar to that of the moving average filter (N=8) 11, and outputs a moving average.

Each of the dual-port RAMs 12 and 22 can store input L-mode (512-chip) samples for one bit (4096 samples), and has a port A ("A-Port" in FIG. 2) for both input and output processes and a port B ("B-Port" in FIG. 2) for only an output process. The RAMs have a size of 256 bits in width and 128 bits in depth.

In write mode, 256-bit samples output from the bit combining section 14 are input to the dual-port RAM 12 from the input port A in a clock of 256 kHz.

256-bit samples stored at a designated address are output to the dual-port RAM 12 from the output port A (A-Port) in a clock of 256 kHz in write mode, and 256-bit samples stored at an address designated by an address generating circuit 17 are output from the output port B (B-Port) in a clock of 4 MHz in read mode.

A description on the dual-port RAM 22 will be omitted for the dual-port RAM 22 performs the same operation for Q-component input data as the dual-port RAM 12. The methods of writing and reading data to and from the dual-port RAMs 12, 22 will be described in detail later.

The lower-248-bits extracting section 13, 23 cuts off the most significant bits (MSB) of 8 bits in 256 bits output from the output port A, and outputs lower 248 bits.

The bit combining section 14, 24 combines 8 bits input from the moving average filter (N=8) 11 and 248 bits input from the lower-248-bits extracting section 13, and outputs the resultant 256 bits to the input port of the dual-port RAM 12, 22 in a clock of 256 kHz. The combined data has upper bits of 248 bits and lower bits of 8 bits.

Though not illustrated, the memory section 1, 2 is provided with means which designates a write address and a read address. The memory section 1, 2 writes data at an address designated by this means in write mode, and reads data from an address designated by the means in read mode.

[Schematic Operation of Memory Section 1, 2: FIG. 2]

Because the operations of the memory sections 1 and 2 are identical to each other except that data to be processed is I-component input data or Q-component input data, the operation of the memory section 1 alone is described briefly referring to FIG. 2, with a description on the memory section 2 being omitted.

In write mode, a moving average (sample) of the I-component input data is generated by the moving average filter (N=8) 11, and input to the bit combining section 14. The lower 248 bits of a sample held at a designated write address are extracted and input to the bit combining section 14 from the output port A at 256 kHz. The bit combining section 14 combines the 248 bits from the lower-248-bits extracting section 13 and a newly input 8-bit sample to provide 256-bit data which is in turn written at a write address in the dual-port RAM 12 at 256 kHz.

In read mode, the dual-port RAM 12 outputs a 256-bit sample from the output port B at 4 MHz according to an address to be designated.

In the present matched filter, after 512-chip samples are all written in the dual-port RAM 12, 22 at 256 kHz, the operation proceeds to a reading operation at 4 MHz, and next writing is carried out when every reading is completed.

Figure 3:
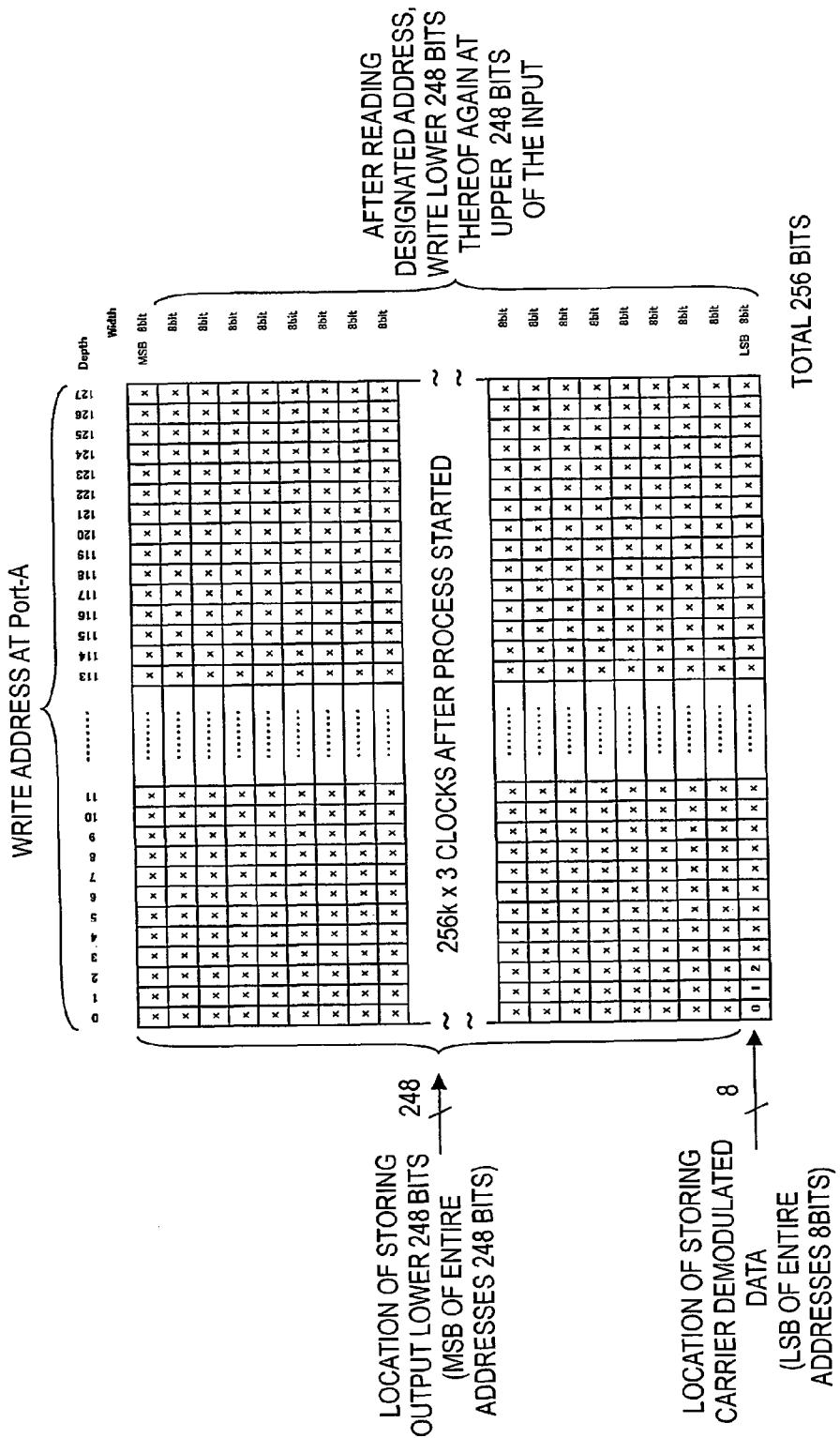
FIG. 3 is an exemplary and explanatory diagram of a case where three clocks have passed since writing to a dual-port RAM started.

[Writing to Dual-port RAM (1): FIG. 3]

Next, a process of writing data to the dual-port RAMs 12 and 22 will be described referring to FIGS. 3 to 5.

FIG. 3 is an exemplary and explanatory diagram of a case where three clocks have passed since writing to the dual-port RAM started.

The dual-port RAMs 12, 22 have a size of 256 bits in width (in the longitudinal direction in the diagrams) and 128 bits in depth (in the lateral direction in the diagrams), and can store 32×128=4096 8-bit samples, thus ensuring storage of 512 chips×8× oversampled samples (512×8=4096 samples). 0 to 127 write addresses are defined in the lateral direction (depth direction).

In the present matched filter, 256-bit samples (32 samples) are written in a clock of 256 kHz. FIG. 3 exemplarily represents how samples are written; 32 samples input from the bit combining section 14, 24 shown in FIG. 2 are written according to the address designation. Numerals in the diagram are process sample numbers, and "x" indicates that no data is written. Write addresses are designated in the order of 0, 1, 2, . . ., 127, and the address 0 is designated again after the address 127.

In the present matched filter, as has been explained above referring to FIG. 2, with regard to carrier demodulated data, one sample is input to the bit combining section 14, 24 in a clock of 256 kHz, and the lower 248 bits already stored at a designated write address and output from the output port A are input to the bit combining section 14, 24 to be combined with the new sample to be output as 256-bit sample data. Accordingly, 8 bits (one sample) of carrier demodulated data is written at the position of 8 bits of the least significant level in the dual-port RAM in FIG. 3, and lower 248 bits of the data from the output port A are written in the upper 248 bits above the LSB.

FIG. 3 shows the state of three clocks of 256 kHz after writing started, and the writing operating up to the state will be described.

When the writing process starts, a write address 0 is designated by the first clock, lower 248 bits of the address 0 output from the output port A are written in the upper 248 bits of the address 0, and a process sample number "0" of the first process sample is written in the lower 8 bits of the address 0 (left end of the least significant level). Since data has not been set yet in the lower 248 bits output from the output port A, "x" is just written in the upper 248 bits are of the address 0.

A write address 1 is designated by the second clock, lower 248 bits of the address 1 output from the output port A are written in the upper 248 bits of the address 1, and a process sample number "1" is written in the lower 8 bits of the address 1.

Figure 4:
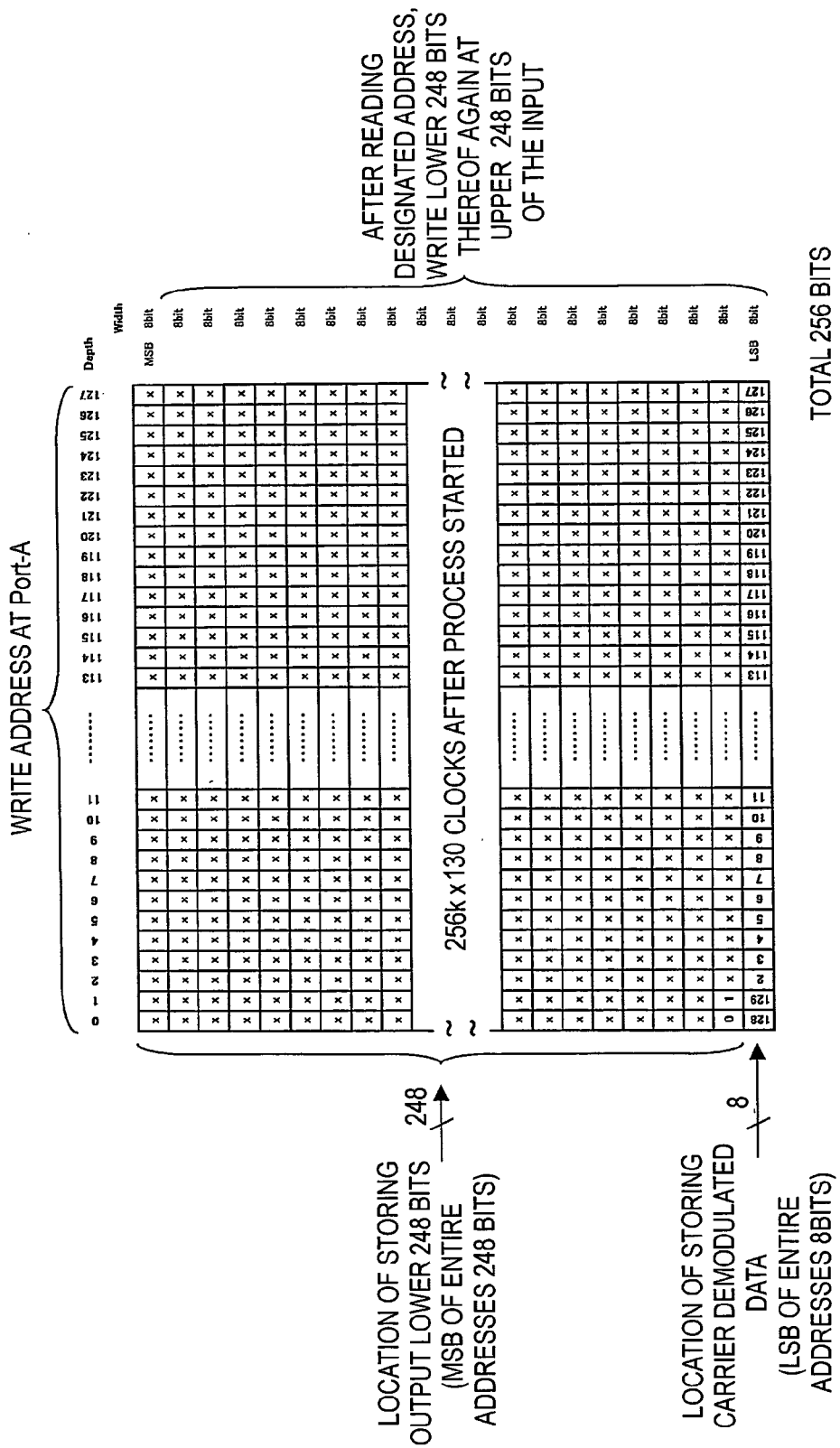
FIG. 4 is an exemplary and explanatory diagram of a case where 130 clocks have passed since writing to a dual-port RAM started.

As shown in FIG. 4, lower 248 bits of the output are written in the upper 248 bits of an address 2, and a process sample number "2" is written in the lower 8 bits of the address 2.

Thereafter, samples are likewise written one at a time in a clock of 256 kHz.

[Writing to Dual-port RAM (2): FIG. 4]

FIG. 4 is an exemplary and explanatory diagram of a case where 130 clocks have passed since writing to the dual-port RAM started.

As samples are written one after another in one clock in the above manner, the lower 8 bits of every address are filled in 128 clocks, and 128 samples with process sample numbers "0", "1", "2", . . ., "127" are stored in order from the left end of the least significant level.

With the 129-th clock, the write address 0 is designated again, 256 bits of the address 0 including the process sample number "0", already stored at the address 0, are output and the lower 248 bits of the 256 bits are written in the upper 248 bits of the address 0 again. That is, the process sample number "0" is shifted to an upper location by 8 bits from the lower location and written there. Then, the process sample number "128" is written in the lower 8 bits of the address 0.

Likewise, as shown in FIG. 4, with the 130-th clock, the address 1 is designated, the process sample number "1" is shifted to an upper location by 8 bits from the lower location and written there. Then, the process sample number "129" is written in the lower 8 bits of the address 1.

[Writing to Dual-port RAM (3): FIG. 5]

Figure 5:
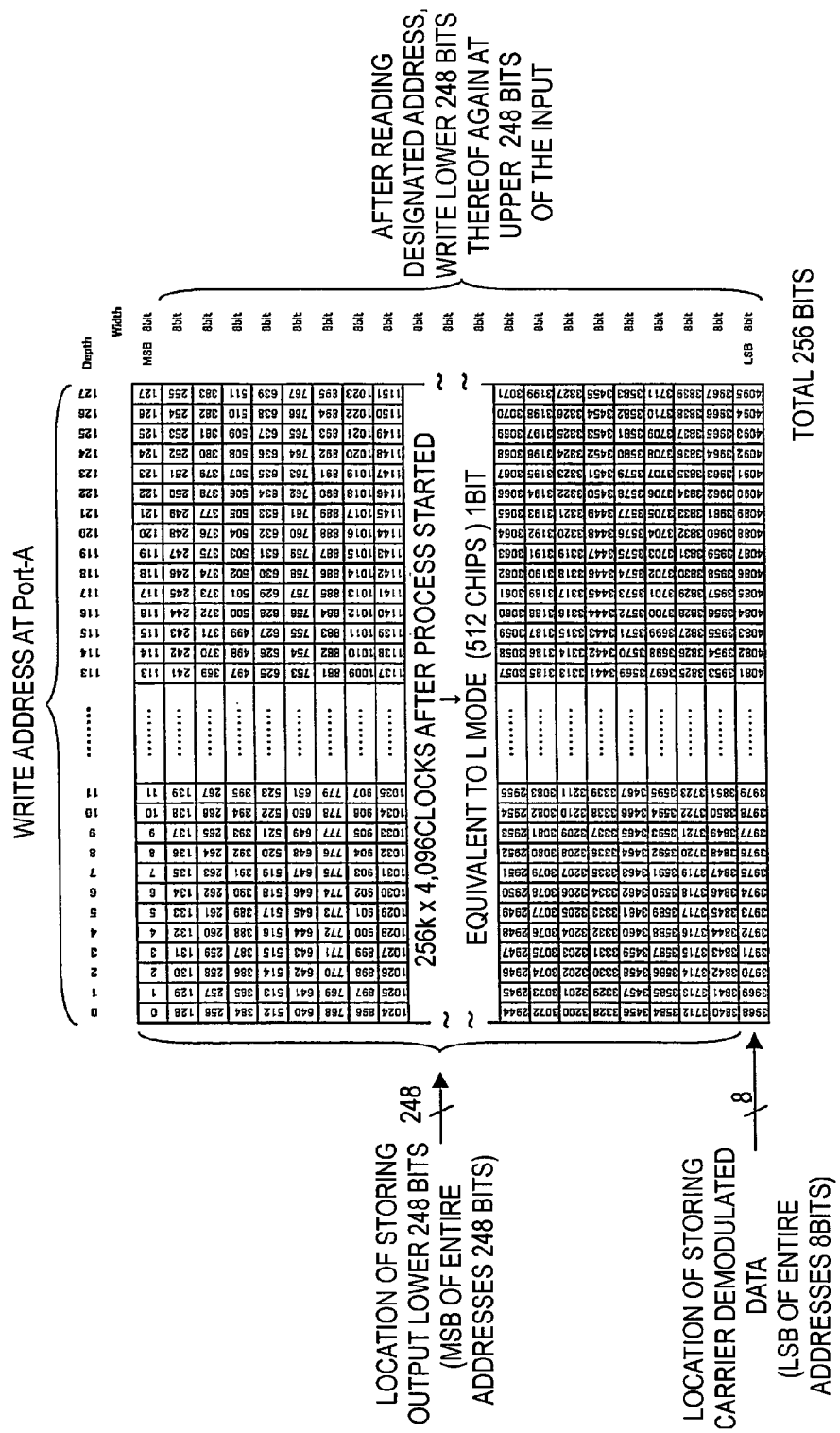
FIG. 5 is an exemplary and explanatory diagram of a case where 4096 clocks have passed since writing to a dual-port RAM started.

FIG. 5 is an exemplary and explanatory diagram of a case where 4096 clocks have passed since writing to the dual-port RAM started.

As shown in FIG. 5, when 4096 clocks pass, the process sample number "0" is stored at the upper left and "4095" is stored at the lower right, completely filling the dual-port RAM. At this time, L-mode (512-chip) samples for one bit are stored in the dual-port RAM.

In this state, the writing process is temporarily terminated and the reading process takes place.

Figure 6:
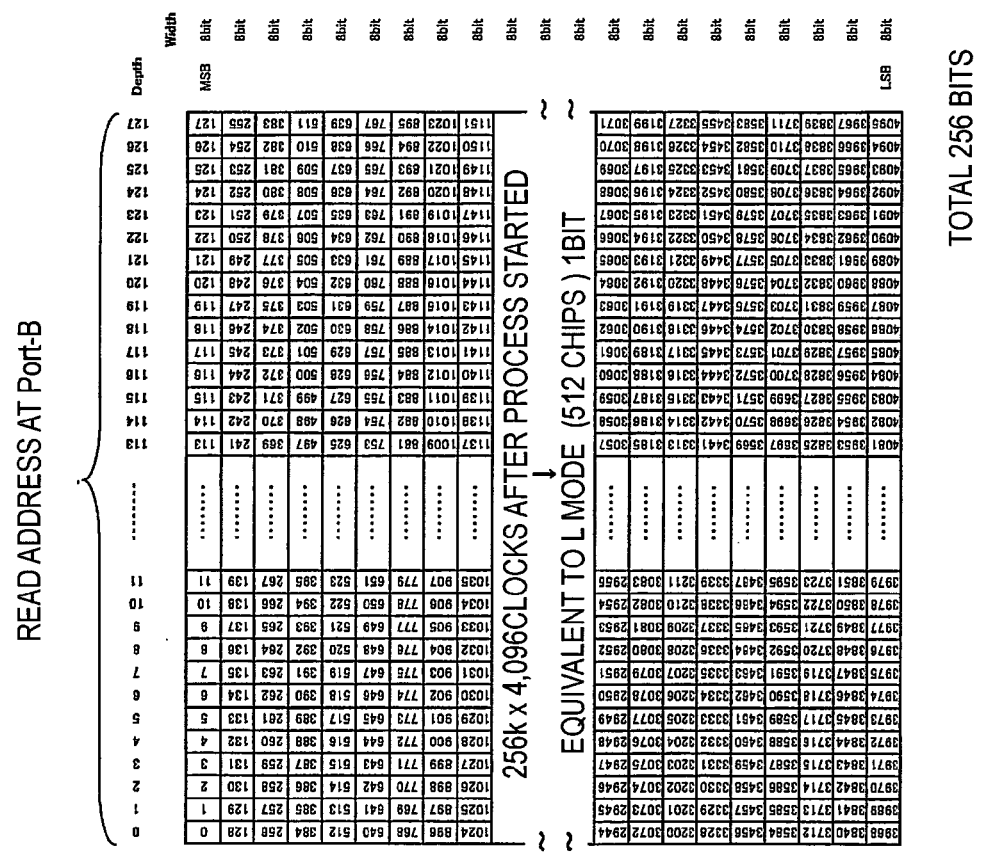

[Read Address of Dual-port RAM: FIG. 6]

Before going into the description of reading from the dual-port RAM, the read address will be described referring to FIG. 6. FIG. 6 is an exemplary and explanatory diagram showing read addresses from the output port B.

Samples written in the dual-port RAM are read from the output port B of the dual-port RAM based on an address designated by the address generating circuit 17. As shown in FIG. 6, read addresses 0 to 127 are defined in the depth direction to be used in sample reading. Addressing of the read addresses is the same as that of the write addresses. 256-bit samples or 32 samples are stored at each address.

Figure 7:
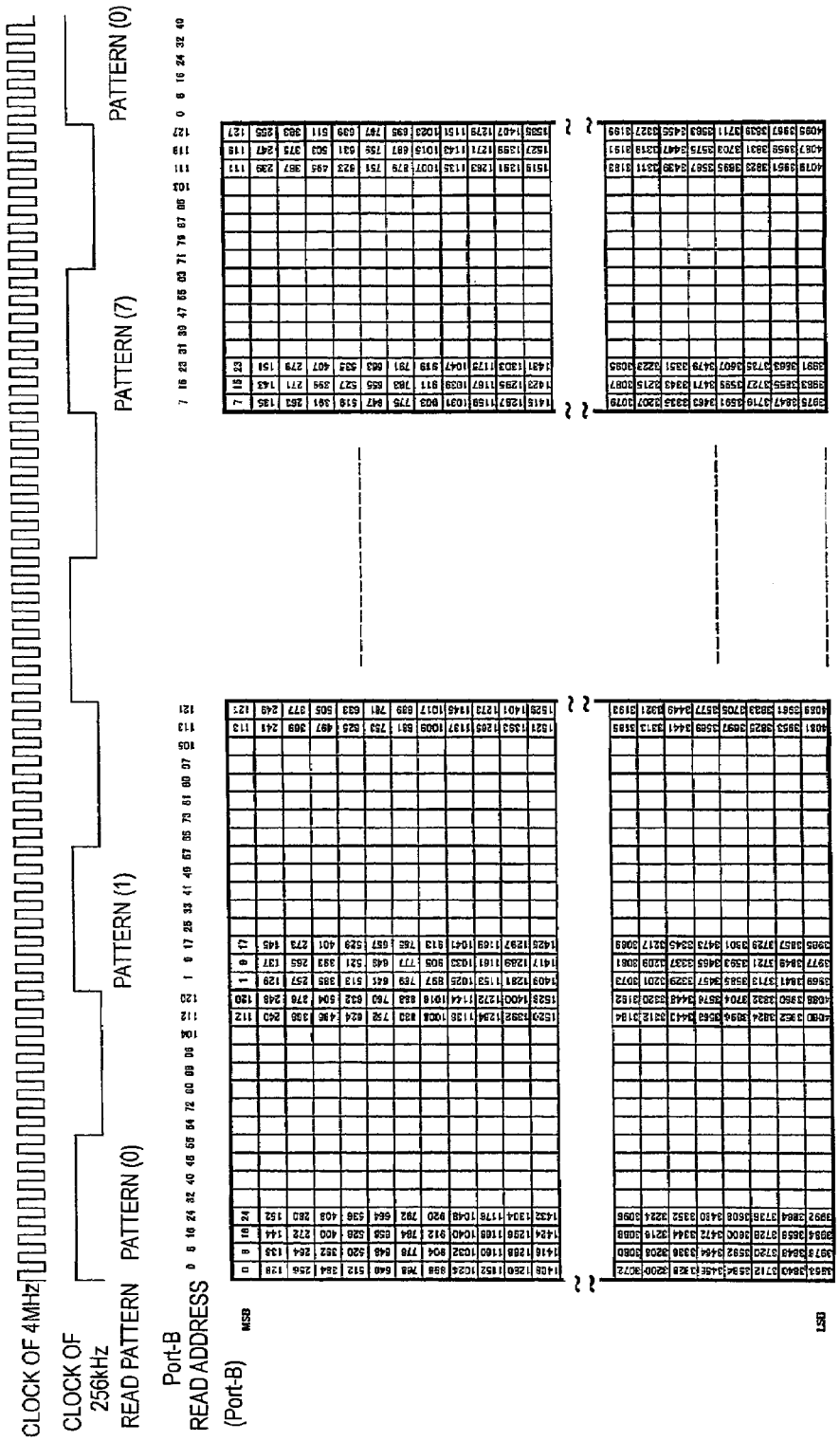
FIG. 7 is an exemplary and explanatory diagram showing reading from a dual-port RAM 12, 22.

[Reading from Dual-port RAM: FIG. 7]

Reading from the dual-port RAM will be described referring to FIG. 7. FIG. 7 is an exemplary and explanatory diagram showing a process of reading data from a dual-port RAM 12, 22.

In the present matched filter, as described above, reading starts with 4096 samples for 512 chips being stored in the dual-port RAM 12. Writing is temporarily stopped until reading is completed. As shown in FIG. 7, the read clock is 4 MHz, and the samples are read, 32 samples at a time, according to the designated read address ("Port-B read address" in the diagram).

In the example of FIG. 7, for example, the read address "0" is designated in the first clock, and samples stored at the read address "0" shown in FIG. 6 are read at a time. There are 32 process sample numbers which are to be read at this time, namely samples "0", "128", "256", "384", . . ., "3968", as shown on the left-end column in FIG. 7. In the present matched filter, a set of 32 samples to be read with a single read address is called "group" for the sake of convenience. Each group is a set of samples extracted every 128-th sample in terms of the process sample number.

With the second clock of 4 MHz, the read address "8" is designated and 32 samples with the process sample numbers "8", "136", "264", "392", . . ., "3976" are read out.

Likewise, with the 16-th clock, the read address "120" is designated and 32 samples with the process sample numbers "120", "248", "376", "504", . . ., "4088" are read out.

In this manner, 16 groups or 32×16=512 samples are read out in 16 clocks of 4 MHz or one clock of 256 kHz.

The 32 samples in the group read in one clock are input to the bit separating section 3 to be separated into bits. The bit separation will be described later.

The feature of the present matched filter lies in that means for designating a read address (read address designating means (not shown)) stores eight patterns of read addresses, patterns (0) to (7) in FIG. 7. Each pattern designates 16 addresses.

Specifically, the pattern (0) designates 16 read addresses of "0", "8", "16", . . ., "120", the pattern (1) designates 16 read addresses of "1", "9", "17", . . ., "121", and so forth up to the pattern (7).

The read address designating means first designates read addresses in the pattern (0) according to a clock of 256 kHz, then designates read addresses in the pattern (1) according to the next clock of 256 kHz when reading in the pattern (0) in 16 clocks of 4 MHz is completed, and keeps designating read addresses up to the pattern (7) while sequentially changing the pattern.

When reading is performed using all of the eight patterns with the read addresses being changed in the order of pattern (0)→pattern (1)→, ..., pattern (7), reading of all the samples (4096 samples=512 chips=1 bit) is completed.

While the order of selecting the read address pattern is not limited to the above example, samples are always read from the dual-port RAM 2 and the dual-port RAM 22 in the same reading pattern, and samples with the same process sample number are processed at the same time.

[Bit Separation: FIG. 7, FIG. 1]

32 samples read out from the dual-port RAM 12, 22 with one address designated in a clock of 4 MHz in the reading process are input to the bit separating section 3 (3a or 3b) shown in FIG. 1, and are separated into 8-bit samples which are simultaneously input to the 32 despreading/accumulating circuits 40-0 to 40-31 (or 50-0 to 50-31).

The operation of the bit separating section 3a will be described specifically. When 32 samples at the address 0 are input to the bit separating section 3a at 4 MHz, the bit separating section 3a separates the input multiplexed data to 8-bit samples, and outputs the separated samples to the despreading/accumulating circuits 40-0 to 40-31 at 4 MHz simultaneously.

That is, the sample with the process sample number "0" shown in FIG. 7 is output to the despreading/accumulating circuit 40-0, at the same time, the sample with the process sample number "128" is output to the despreading/accumulating circuit 40-1, and thereafter samples are likewise sequentially input the associated despreading/accumulating circuits 40 until the sample with the process sample number "3968" is output to the despreading/accumulating circuit 40-31 at the same time.

In other words, in the exemplary diagram of FIG. 7, at the time of reading samples from the dual-port RAM 12, 22, samples are read in a column designated by the address, and with samples separated by the bit separating section 3, a block having 16 samples indicated by a row is output to the same despreading/accumulating circuit 40, 50.

For example, samples "0", "8", "16", "24" and so forth are input to the despreading/accumulating circuit 40-0 in every clock of 4 MHz, and a sample "120" is input in the 16-th clock.

Likewise, samples "128", "136", "144", "152", ..., "248" are input to the despreading/accumulating circuit 40-1, and samples "3968", "3976", "3984", ..., "4088" are input to the despreading/accumulating circuit 40-31.

[Despreading/accumulating Process: FIG. 1]

Next, the despreading/accumulating process will be briefly described referring to FIG. 1. Because the despreading/accumulating circuit 40 and the despreading/accumulating circuit 50 are different only in the type of a signal to be processed, an I-component signal or Q-component signal, and are identical in configuration and operation, only the despreading/accumulating circuit 40 will be described.

The despreading/accumulating circuit 40-n (n=0 to 31) performs a despreading/accumulating process on samples input from the bit separating section 3a at 4 MHz, based on a spread code (spread symbol, Code(n)) for despreading input from the despread symbol separating/outputting section (not shown) also at 4 MHz, adds up the results of despreading of 16 samples, and outputs the accumulated value for each block.

For example, in the first clock of 256 kHz, the despreading/accumulating circuit 40-0 processes 16 samples ("0", "8", "16", ..., "120") horizontally aligned in FIG. 7 in the samples read in the read pattern (0), and outputs the result of the accumulation of the despreading results.

In the second clock of 256 kHz, 16 samples horizontally aligned in the samples read in the read pattern (1) are processed, and the result of the accumulation of the despreading results is output.

In the eighth clock of 256 kHz, 16 samples horizontally aligned in the samples read in the read pattern (7) are processed, and the result of the accumulation of the despreading results is output.

As this operation is carried out in the 32 despreading/accumulating circuits 40, all the samples are read and subjected to the despreading/accumulating process in eight clocks of 256 kHz.

[Separation Symbol Pattern: FIG. 8]

Spread codes to be supplied to the despreading/accumulating circuits 40, 50 will be described referring to FIG. 8. FIG. 8 is an explanatory diagram showing patterns (kinds) of despread codes output from the despread symbol separating/outputting section.

A spread code defined according to the chip of a sample to be despread is supplied to the despreading/accumulating circuit 40, 50 for the despreading process. For this purpose, the despread symbol separating/outputting section stores 16 patterns of spread codes according to the arrangement of samples held in the dual-port RAM 12, 22, and sequentially outputs spread codes to each despreading/accumulating circuit 40, 50 in a clock of 4 MHz while changing the spread codes from one to another.

As shown in FIG. 8, spread codes from a spread code Code(0) output to the despreading/accumulating circuit 40-0 and despreading/accumulating circuit 50-0 to a spread code Code(31) output to the despreading/accumulating circuit 40-31 and despreading/accumulating circuit 50-31 are separated and defined in 16 patterns, and 16 kinds of spread codes from a pattern 0 to a pattern 15 are sequentially read and output to the respective despreading/accumulating circuit 40, 50 at ever 4 MHz.

As shown in FIG. 8, the despread symbol separating section stores spread codes for 512 chips, and spread codes to be output are defined according to chips equivalent to samples which are input to each despreading/accumulating circuit 40, 50 to be despread. The numerals in FIG. 8 are equivalent to chip numbers. In the present matched filter, the entire arrangement of spread codes for 512 chips is called "separation symbol pattern".

When all the spread codes in a pattern are output at 256 kHz, the process returns to the first pattern to repetitively read spread codes. This process is repeated eight times, completing the despreading of all the samples stored in the dual-port RAM 12, 22.

Specifically, first, despreading is performed on samples read in the read address pattern (0), secondly, despreading is performed on samples read in the read address pattern (1), despreading is performed in this manner, and the eighth despreading is performed on samples read in the read address pattern (7), thus completing the despreading process.

Advantage of Embodiment

The matched filter according to the embodiment of the invention has the following advantage. In the case of 512-chip 8× oversampling, the dual-port RAMs 12, 22 each having a memory size of 128×256 bits are used as a sample and hold circuit, to store samples for one bit in 4096 clocks of 256 kHz in write mode. The process is shifted to the reading process, when all the 4096 samples are stored, to sequentially read groups of samples, each containing 32 samples extracted every 129-th sample in terms of the process sample number, in a clock of 4 MHz. The bit separating section 3a, 3b extracts samples from each group, one at a time, and outputs the extracted samples to the 32 despreading/accumulating circuits 40, 50 at 4 MHz. Each despreading/accumulating circuit 40, 50 performs despreading for each sample using a given spread code, accumulates despreading results for each block, and outputs an accumulated value for 16 samples as one block at every 256 kHz. The absolute value calculating circuit 6 calculates an absolute value for every 32 blocks based on the accumulated values for the I signal and Q signal. The accumulating section 8 adds up the absolute values for the respective blocks, and outputs resultant correlation value data. Accordingly, as the despreading and accumulation are carried out block by block, the numbers of the multipliers and adders can be reduced to 1/16.

Another Embodiment

Next, a matched filter according to another embodiment of the present invention will be described.

While the foregoing matched filter starts reading when all of 4096 samples are written, and executes next writing when reading of all the samples is completed, the matched filter according to another embodiment starts reading before writing of all the samples is completed, and executes writing and reading in parallel.

The configuration of the another matched filter is substantially identical to the configuration of the foregoing matched filter, and is different therefrom in parts of the process of reading from the dual-port RAM and the despreading process.

Figure 9:
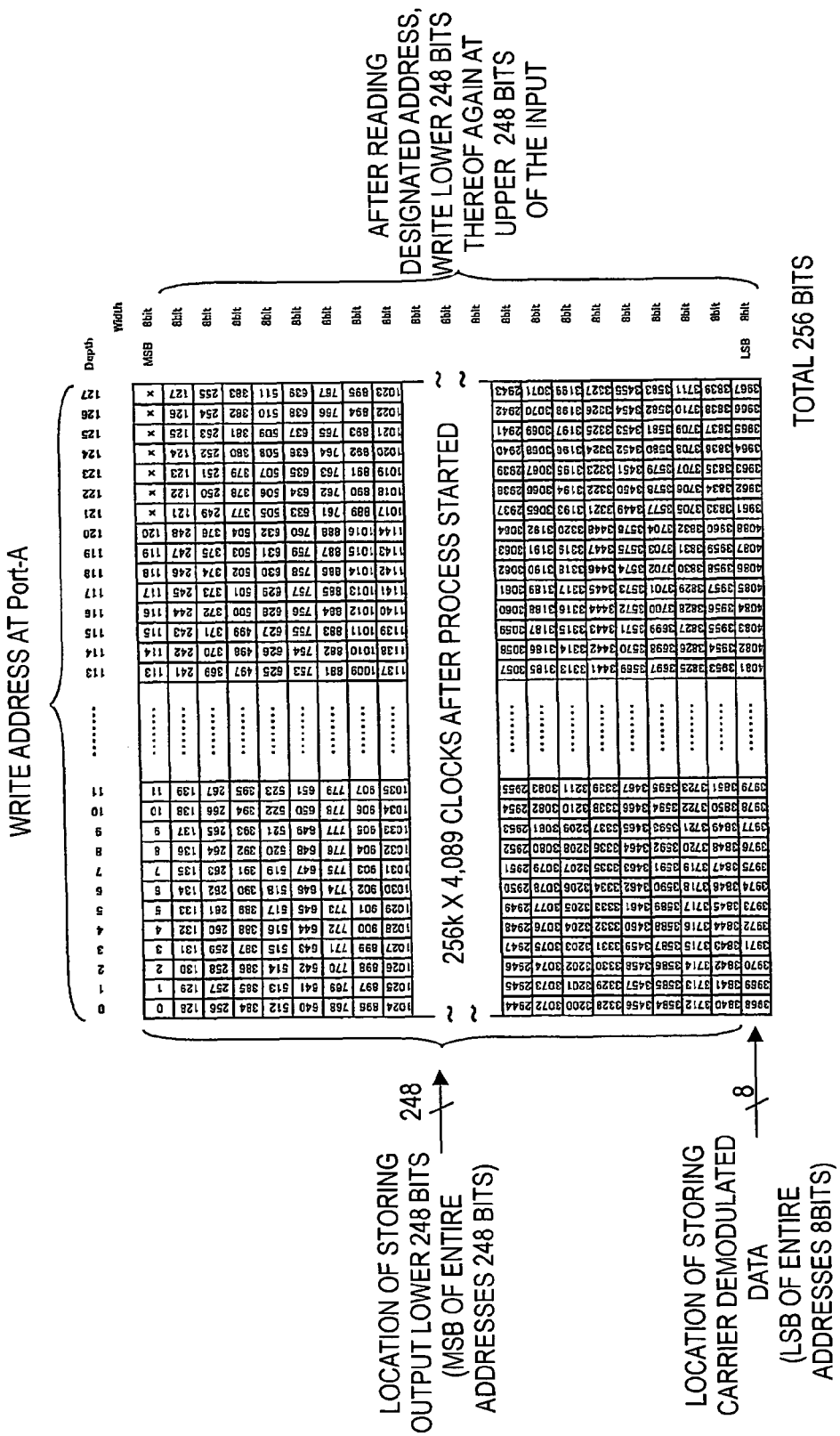
FIG. 9 is an exemplary and explanatory diagram showing writing/reading in a matched filter according to another embodiment of the present invention (another matched filter).

[Writing in Another Matched Filter (1): FIG. 9]

FIG. 9 is an exemplary and explanatory diagram showing writing/reading in the matched filter according to another embodiment of the present invention (another matched filter).

As shown in FIG. 9, the another matched filter performs writing of one sample in a clock of 256 kHz in a similar way to that explained above referring to FIGS. 3 to 5. When a sample "4088" (4089-th sample) is written at the LSB of the address 120 in the 4089-th clock of 256 kHz, reading at 4 MHz is started. FIG. 9 shows that writing in the 4089-th clock of 256 kHz has ended. The reading process will be described in detail later.

The another matched filter executes writing while executing reading as mentioned above, maintains the writing process even after 4096 clocks have passed since the initiation of the writing process, executes writing and reading in parallel, and detects correlation values without interruption.

Figure 10:
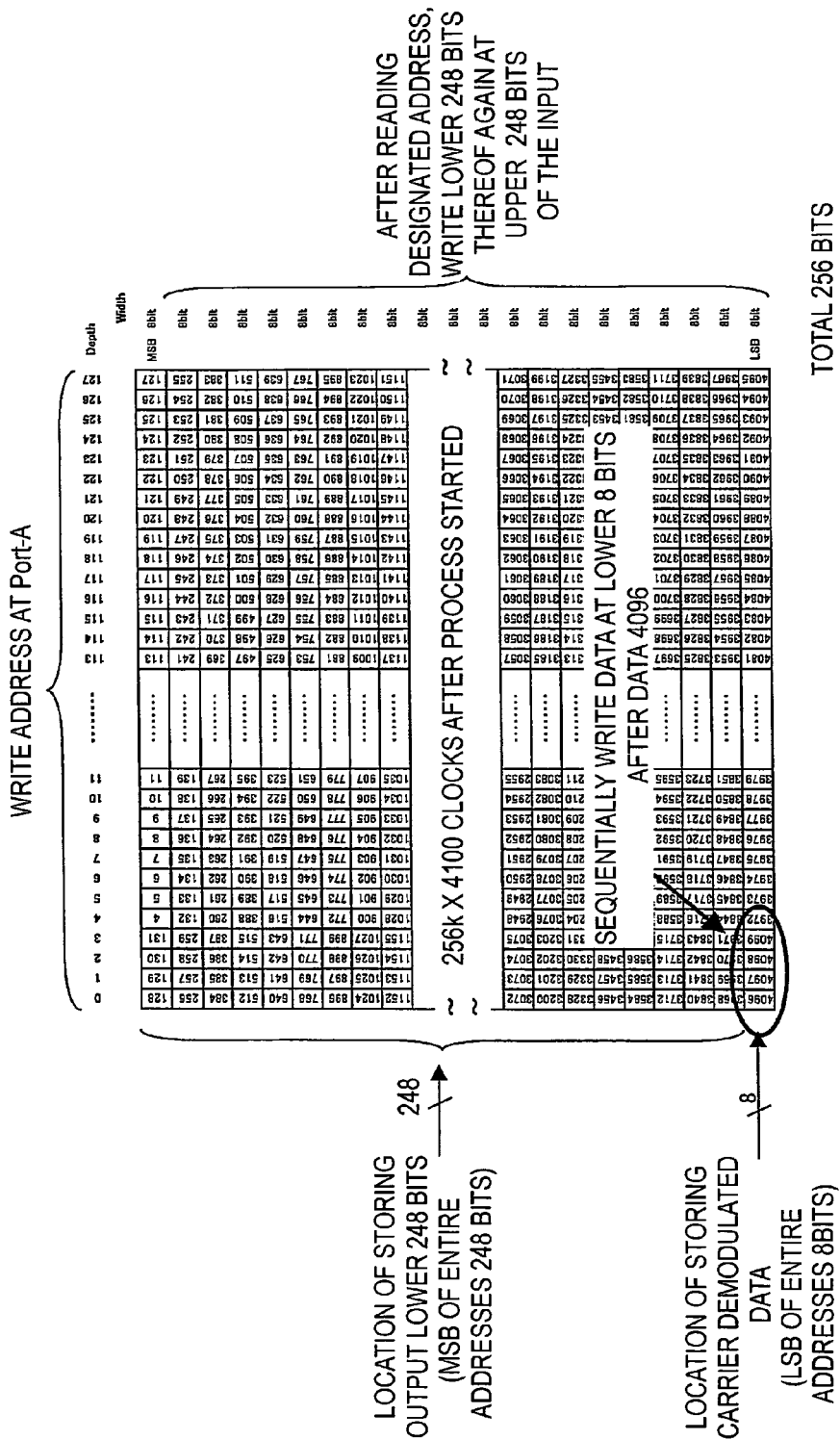
FIG. 10 is an exemplary and explanatory diagram of a case where 4100 clocks have passed since writing to a dual-port RAM in the another matched filter started.

[Writing in Another Matched Filter (2): FIG. 10]

Next, the writing operation at and following the 4097-th clock will be described referring to FIG. 10. FIG. 10 is an exemplary and explanatory diagram of a case where 4100 clocks have passed since writing to the dual-port RAM in the another matched filter started.

As shown in FIG. 10, a write address 0 is designated in the 4097-th clock of 256 kHz, lower 248 bits of the address 0 output from the output port A (DOUTA) are written at the upper 248 bits of the address 0, and a process sample number "4096" is written at the lower 8 bits of the address 0. In the another matched filter, reading of the process sample number "0" is completed before the process sample number "4096" is written as will be described later, so that processing on the first sample with the process sample number "0" in the matched filter is terminated.

A write address 1 is designated in the 4098-th clock of 256 kHz, lower 248 bits of the address 0 output from the output port A are written at the upper 248 bits of the address 1, and a process sample number "4097" is written at the lower 8 bits of the address 1. Accordingly, processing on the second sample with the process sample number "1" in the matched filter is terminated.

Thereafter, samples are written in a clock of 256 kHz one at a time.

[Read Address Pattern of Another Matched Filter: FIG. 11]

The read address patterns which characterize the another matched filter will be described referring to FIG. 11. FIG. 11 is an exemplary and explanatory diagram showing read address patterns of the another matched filter.

As shown in FIG. 11, there are 128 read address pattern for the another matched filter. The first eight patterns in the 128 read address patterns are the same as the read address patterns (0) to (7) shown in FIG. 7, and the subsequent patterns are designed to have the arrangements of the addresses in the read address patterns (0) to (7) shown in FIG. 7 shifted one by one.

Specifically, 16 kinds of read address patterns (0), (8), (16), . . . , (120) of the another matched filter shown in FIG. 11 are all formed by the same addresses whose layout order is "0, 8, 16, . . . , 120" in the read address pattern (0), and is shifted one by one so that the layout order in the read address pattern (8) becomes "8, 16, 24, . . . , 120, 0".

Likewise, 15 kinds of read address patterns with the same address structure and the layout order being shifted are provided for the read address patterns (1) to (7). Because the another matched filter has 16 kinds of layout orders for each of the read address patterns (0) to (7) shown in FIG. 7, therefore, there are 8×16=128 read address patterns available.

In the reading process, a read address pattern is designated in a clock of 256 kHz (every 16 clocks of 4 MHz), and address in the read address pattern are sequentially read out in a clock of 4 MHz. After reading of the read address pattern (127) is finished, the read address patterns starting from the pattern (0) are used again.

Figure 12:
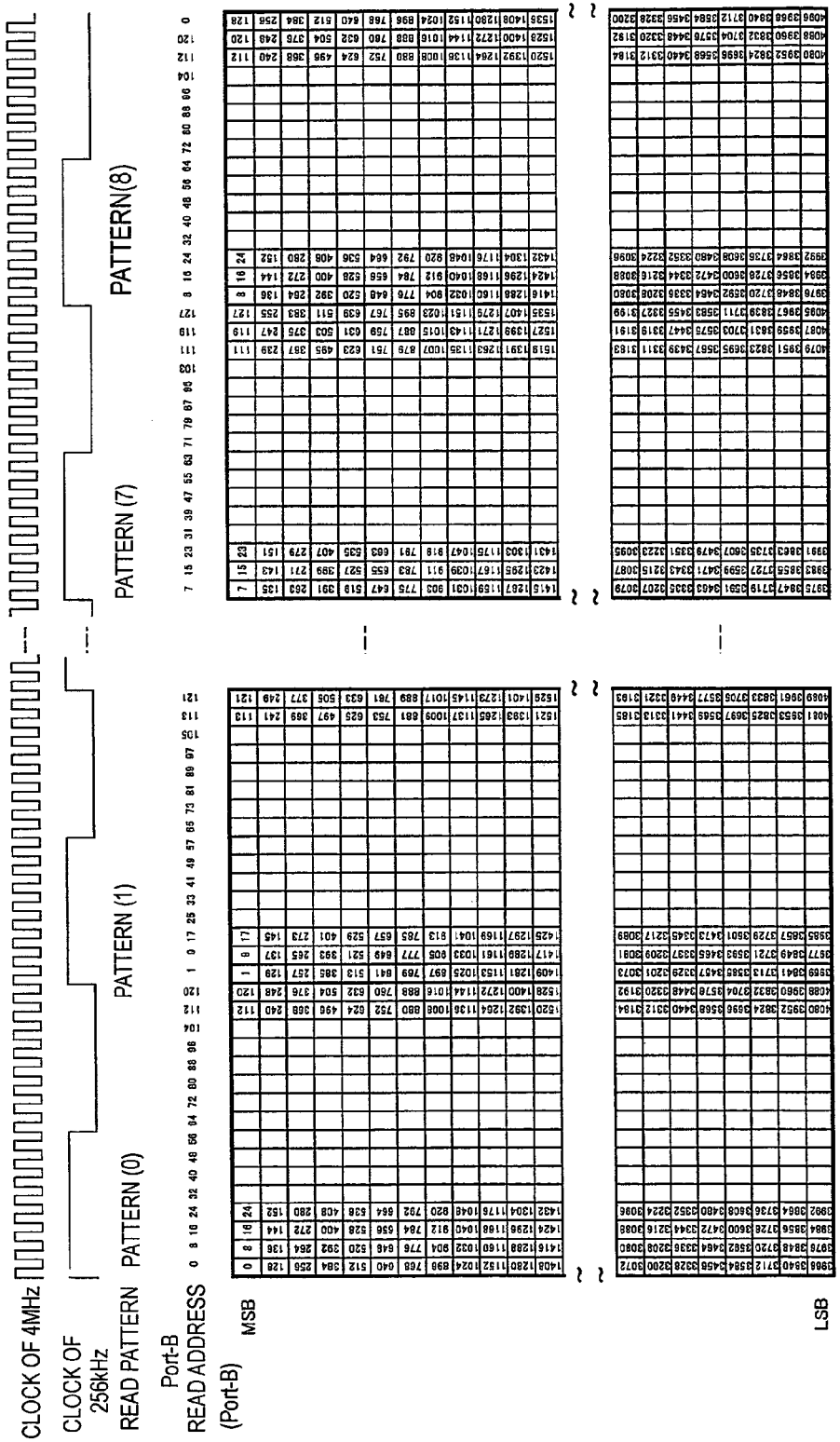
FIG. 12 is an exemplary and explanatory diagram showing a reading process of the another matched filter.
Figure 13:
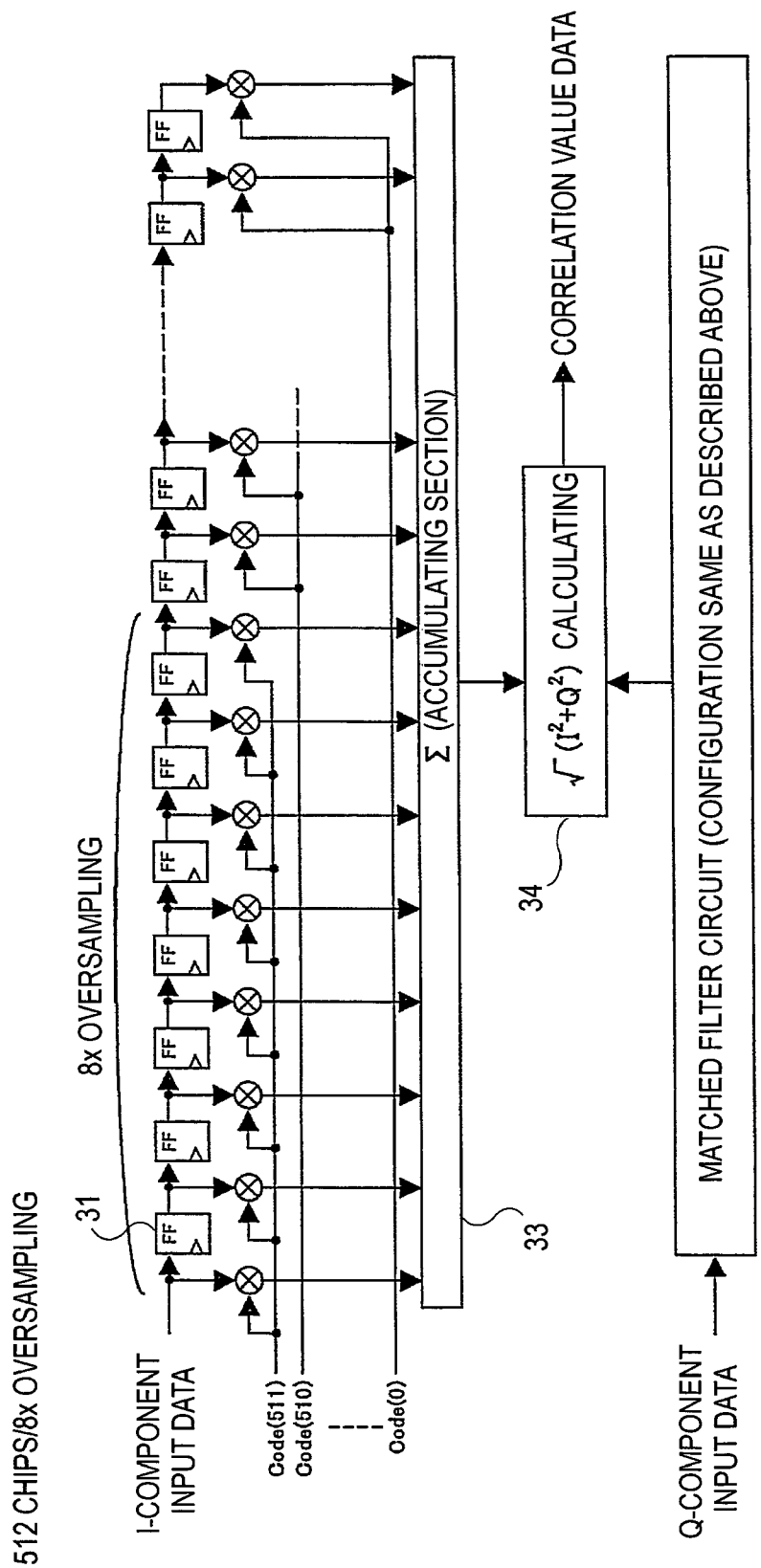
FIG. 13 is a configurational diagram of a conventional matched filter.
Figure 14:
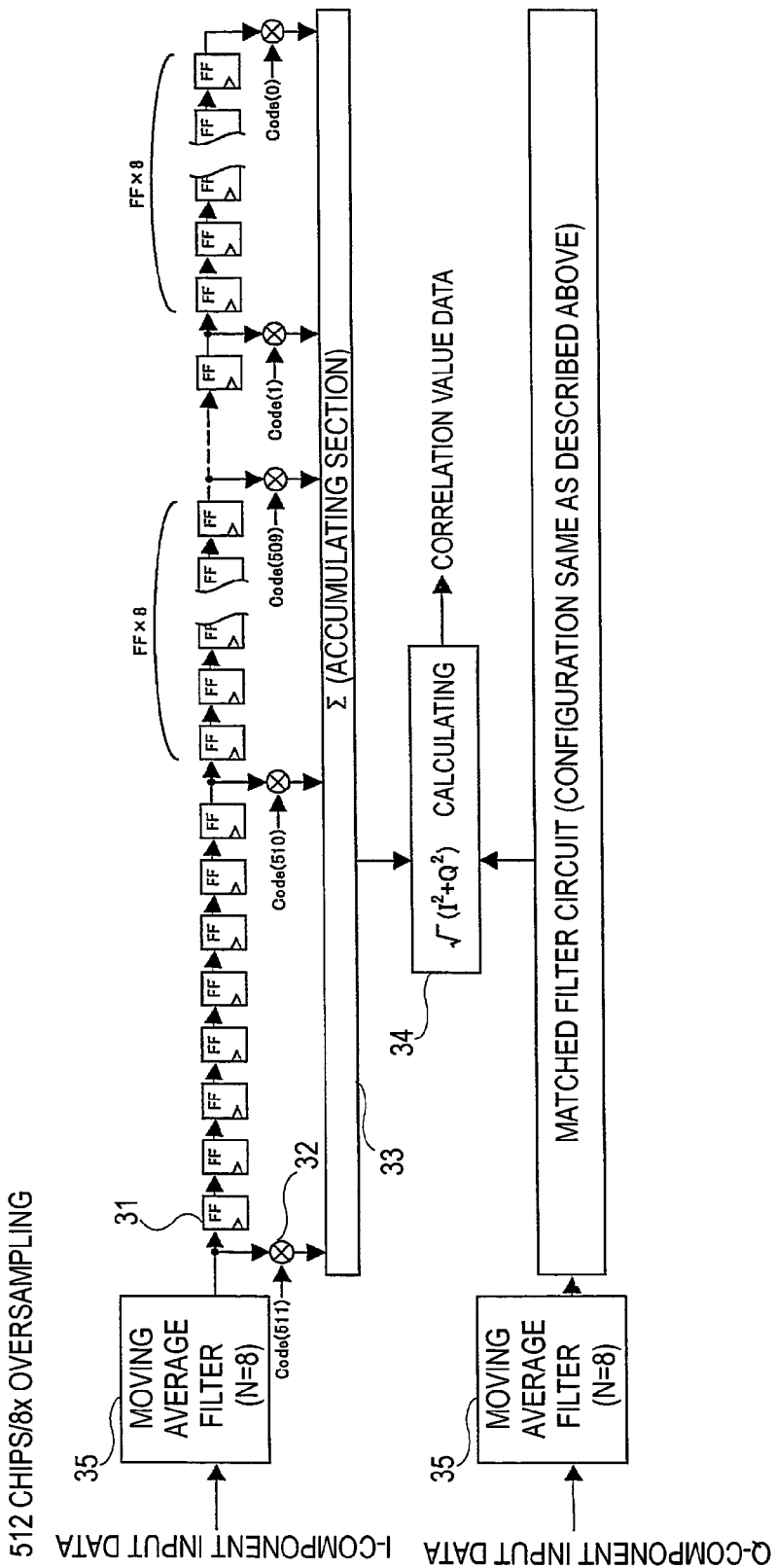
FIG. 14 is a configurational diagram showing the configuration of a second conventional matched filter.

[Reading Process of Another Matched Filter: FIGS. 9, 12]

The reading process of the another matched filter will be described referring to FIGS. 9 and 12. FIGS. 9 and 12 are exemplary and explanatory diagrams showing the reading process of the another matched filter.

As shown in FIG. 12, the dual-port RAM 12, 22 of the another matched filter starts reading in the 4089-th clock of 256 kHz (state in FIG. 9), first, in the first clock of 4 MHz, the read address "0" is designated according to the read address pattern (0), and samples "0", "128", "256", . . . , "3968" are read out simultaneously.

Then, in the second clock of 4 MHz, the read address "8" in the read address pattern (0) is designated and samples "8", "136", "264", . . . , "3976" are read out simultaneously.

Thereafter, likewise, in the 16-th clock of 4 MHz, the read address "120" in the read address pattern (0) is designated, and samples "120", "248", "376", . . . , "4088" are read out simultaneously.

This completes reading according to the read address pattern (0).

At the next timing which is the 4090-th clock of 256 kHz, a next sample "4089" is written at the lower 8 bits of the address 121.

At the same time, reading according to the read address pattern (1) is started.

Specifically, first, the read address "1" is designated, and samples "1", "129", "257", . . . , "3969" are read out simultaneously.

In next clock of 4 MHz, the read address "9" is designated and samples "9", "137", "265", . . . , "3977" are read out simultaneously. Thereafter, likewise, in the 16-th clock of 4

MHz, the read address "121" in the read address pattern (1) is designated, and samples "121", "249", "377", . . . , "4089" are read out simultaneously.

In the 4096-th clock of 256 kHz, a sample "4095" is written at the lower 8 bits of an address 127 and reading according to the read address pattern (7) in FIG. 11 is executed, and the entire reading is completed in the 16-th clock of 4 MHz.

In the next 4097-th clock of 256 kHz, a sample "4096" is written at the lower 8 bits of the address 0 and reading according to the read address pattern (8) shown in FIG. 11 is executed.

Specifically, in the first clock of 4 MHz, the address "8" in the read address pattern (8) is designated and the samples "8", "136", "264", . . . , "3976" are read out.

In the second clock of 4 MHz, the address "16" in the read address pattern (8) is designated and the samples "16", "144", "272", . . . , "3984" are read out.

Thereafter, addresses are sequentially designated according to the address arrangement of the read address pattern (8) to execute reading every clock of 4 MHz, and the address "02" is designated in the 16-th clock.

At this time, the process sample number "4096" has already been written at the lower 8 bits of the address "0", so that a newest group of data in 16 clocks is stored.

The reading process therefore has a time allowance given by using a read address pattern in which an address containing data to be written latest is designed at the last of 16 clocks.

As apparent from the above, the another matched filter keeps writing data to the dual-port RAM to update the contents thereof at 256 kHz, and reads data stored therein according to a read address pattern shown in FIG. 11 at 4 MHz to be subjected to the despreading process in the subsequent stage.

[Separation Symbol Pattern in Another Matched Filter: FIG. 8]

In the another matched filter, the despread symbol separating section also outputs 16 patterns of spread codes shown in FIG. 8 to the despreading/accumulating circuits 40, 50 in a clock of 4 MHz.

As the another matched filter executes writing and reading in parallel in the above manner, it can continuously execute the writing process without interruption, making the process faster and making control easier.

Although reading starts in the 4089-th clock of 256 kHz, reading can start in any clock between the 4089-th clock and the 4096-th clock without being affected. When the reading process starts in the 4097-th clock or later clock, however, the sample with the process sample number "0" in the read address pattern (0) that should be read in the first clock of 4 MHz at which reading starts is not read out and is overwritten in the writing process for the process sample number "4097", so that the despreading process is not performed properly. This case is therefore undesirable.

Advantage of Another Embodiment

The matched filter according to the another embodiment of the invention can reduce the circuit scale, and can continuously execute the writing process without interruption by starting the reading process in a clock of 256 kHz in the range of 4089-th clock to the 4096-th clock and executing the writing process and reading process in parallel. This brings about an advantage that stable reception can be executed without missing detection of original correlation values of received data which may be caused by such interruption.

The present invention is suitable for a matched filter whose circuit scale can be reduced significantly.

What is claimed is:

1. A matched filter for outputting correlation value data based on input samples, comprising:
    a dual-port memory, provided for each of an in-phase component and an orthogonal component of an input signal, that separates written samples into a specific number of groups of samples which are collectively read out group by group in order at a speed faster than a write speed in write mode;
    a bit separating section, provided for each of the in-phase component and the orthogonal component, that separates data collectively read group by group into samples and simultaneously outputs the samples;
    a plurality of despreading/accumulating circuits, provided for each of the in-phase component and the orthogonal component, that serially receive samples separated from a plurality of groups as blocks, despread respective samples, accumulate despreading results, and output accumulated values for each block;
    a plurality of absolute value calculating circuits that calculate absolute values for each block from outputs of the plurality of despreading/accumulating circuits for the in-phase component and outputs of the plurality of despreading/accumulating circuits for the orthogonal component; and
    an accumulating section that accumulates outputs of the plurality of absolute value calculating circuits and outputs correlation value data.

2. A matched filter for outputting correlation value data based on samples originated from 5 chip 8× oversampling, comprising:
    a dual-port RAM, provided for each of an in-phase component and an orthogonal component of an input signal, that separates written samples into 128 groups each of 32 samples which are collectively read out group by group in order at a speed faster than a write speed in write mode;
    a bit separating section, provided for each of the in-phase component and the orthogonal component, that separates data collectively read group by group into samples and simultaneously outputs 32 samples;
    32 despreading/accumulating circuits, provided for each of the in-phase component and the orthogonal component, that, with 16 samples sequentially input from 16 groups in the 128 groups being taken as one block, sequentially despread individual samples with corresponding spread codes, accumulate despreading results, and output accumulated values for each block;
    32 absolute value calculating circuits that calculate absolute values for each block from outputs of the 32 despreading/accumulating circuits for the in-phase component and outputs of the 32 despreading/accumulating circuits for the orthogonal component; and
    an accumulating section that accumulates outputs of the 32 absolute value calculating circuits and outputs correlation value data.

3. The matched filter according to claim 2, wherein the group is formed to have 32 samples extracted every 128-th sampling number.

4. The matched filter according to claim 2, wherein writing into the dual-port RAM is performed in a clock of 256 kHz, and reading therefrom is performed in a clock of 4 MHz.

5. The matched filter according to claim 3, wherein writing into the dual-port RAM is performed in a clock of 256 kHz, and reading therefrom is performed in a clock of 4 MHz.

6. The matched filter according to claim 4, wherein reading from the dual-port RAM starts after all of 4096 samples for 512 1-bit chips are written into the dual-port RAM.

7. The matched filter according to claim 5, wherein reading from the dual-port RAM starts after all of 4096 samples for 512 1-bit chips are written into the dual-port RAM.

8. The matched filter according to claim 6, further comprising an address generating circuit that sends a read address specifying a group to be read to the dual-port RAM and stores eight read address patterns each having 16 addresses extracted every 8-th addresses from among addresses 0 to 127,
wherein the eight read address patterns are sequentially selected, changed over from one read address pattern to another, in a clock of 256 kHz, and 16 addresses included in the selected read address pattern are sequentially output from a top in a clock of 4 MHz.

9. The matched filter according to claim 7, further comprising an address generating circuit that sends a read address specifying a group to be read to the dual-port RAM and stores eight read address patterns each having 16 addresses extracted every 8-th addresses from among addresses 0 to 127,
wherein the eight read address patterns are sequentially selected, changed over from one read address pattern to another, in a clock of 256 kHz, and 16 addresses included in the selected read address pattern are sequentially output from a top in a clock of 4 MHz.

10. The matched filter according to claim 4, wherein reading from the dual-port RAM starts after a 4089-th sample is written into the dual-port RAM since writing has started.

11. The matched filter according to claim 5, wherein reading from the dual-port RAM starts after a 4089-th sample is written into the dual-port RAM since writing has started.

12. The matched filter according to claim 10, further comprising an address generating circuit that sends a read address specifying a group to be read to the dual-port RAM and stores a total of 128 read address patterns each having 16 read address patterns generated by sequentially shifting an arrangement of 16 addresses forming each read address pattern for each read address pattern based on eight read address patterns each having 16 addresses extracted every 8-th addresses from among addresses 0 to 127, wherein the eight read address patterns are sequentially selected, changed over from one read address pattern to another, in a clock of 256 kHz, and 16 addresses included in the selected read address pattern are sequentially output from a top in an order of the arrangement in a clock of 4 MHz.

13. The matched filter according to claim 11, further comprising an address generating circuit that sends a read address specifying a group to be read to the dual-port RAM and stores a total of 128 read address patterns each having 16 read address patterns generated by sequentially shifting an arrangement of 16 addresses forming each read address pattern for each read address pattern based on eight read address patterns each having 16 addresses extracted every 8-th addresses from among addresses 0 to 127,
wherein the eight read address patterns are sequentially selected, changed over from one read address pattern to another, in a clock of 256 kHz, and 16 addresses included in the selected read address pattern are sequentially output from a top in an order of the arrangement in a clock of 4 MHz.

14. The matched filter according to claim 8, further comprising a despread symbol outputting section that outputs spread codes to each of the despreading/accumulating circuits, stores a separation symbol pattern defining an arrangement order of 16 kinds of spread codes for each despreading/accumulating circuit, and sequentially selects the 16 kinds of spread codes of the separation symbol pattern in the arrangement order and outputs the selected spread code to a corresponding one of the despreading/accumulating circuits in a clock of 4 MHz.

15. The matched filter according to claim 9, further comprising a despread symbol outputting section that outputs spread codes to each of the despreading/accumulating circuits, stores a separation symbol pattern defining an arrangement order of 16 kinds of spread codes for each despreading/accumulating circuit, and sequentially selects the 16 kinds of spread codes of the separation symbol pattern in the arrangement order and outputs the selected spread code to a corresponding one of the despreading/accumulating circuits in a clock of 4 MHz.

16. The matched filter according to claim 12, further comprising a despread symbol outputting section that outputs spread codes to each of the despreading/accumulating circuits, stores a separation symbol pattern defining an arrangement order of 16 kinds of spread codes for each despreading/accumulating circuit, and sequentially selects the 16 kinds of spread codes of the separation symbol pattern in the arrangement order and outputs the selected spread code to a corresponding one of the despreading/accumulating circuits in a clock of 4 MHz.

17. The matched filter according to claim 13, further comprising a despread symbol outputting section that outputs spread codes to each of the despreading/accumulating circuits, stores a separation symbol pattern defining an arrangement order of 16 kinds of spread codes for each despreading/accumulating circuit, and sequentially selects the 16 kinds of spread codes of the separation symbol pattern in the arrangement order and outputs the selected spread code to a corresponding one of the despreading/accumulating circuits in a clock of 4 MHz.

* * * * *